United States Patent [19]

Hirata et al.

[11] 3,847,728

[45] Nov. 12, 1974

[54] RESINOUS COMPOSITIONS HAVING IMPROVED GAS PERMEATION RESISTANCE AND MOLDED STRUCTURES THEREOF

[75] Inventors: Sadao Hirata, Yokohama; Muneki Yamada; Akira Kishimoto, both of Tokyo, all of Japan

[73] Assignee: Toyo Seikan Kaisha Limited, Tokyo, Japan

[22] Filed: May 31, 1972

[21] Appl. No.: 258,428

[52] U.S. Cl. ............. 161/252, 161/254, 260/897 B, 264/241
[51] Int. Cl. ............................................. B32b 27/08
[58] Field of Search ................. 260/897 B; 161/252

[56] References Cited
UNITED STATES PATENTS

| | | | |
|---|---|---|---|
| 3,560,325 | 2/1971 | Sogi et al. | 161/252 |
| 3,560,318 | 2/1971 | Miller | 161/252 |
| 3,182,101 | 5/1965 | Rees | 260/897 B |
| 3,399,250 | 8/1968 | Kirk et al. | 260/897 B |
| 3,542,712 | 11/1970 | Gorton et al. | 260/897 B |
| 3,663,663 | 5/1972 | McAda | 260/897 B |
| 3,615,106 | 10/1971 | Flanagan et al. | 260/897 B |
| 3,422,055 | 1/1969 | Maloney | 260/897 B |
| 3,419,654 | 12/1968 | Chiba et al. | 260/897 B |

FOREIGN PATENTS OR APPLICATIONS

| | | |
|---|---|---|
| 1,950,479 | 5/1970 | Germany |
| 1,254,354 | 11/1971 | Great Britain |

OTHER PUBLICATIONS

Chemical Abstracts, 75:6914W, (Soki) Japan, 70, 31, 758.

Primary Examiner—George F. Lesmes
Assistant Examiner—William R. Dixon, Jr.
Attorney, Agent, or Firm—Diller, Brown, Ramik & Wight

[57] ABSTRACT

A resinous composition having an improved gas permeation resistance, which comprises a mixture of 55 to 98 percent by weight of a crystalline polyolefin and 2 to 45 percent by weight of a saponified product of an ethylene-vinyl acetate copolymer having an ethylene content of 25 to 75 mole percent and a degree of saponification of at least 93 percent, and a molded structure formed therefrom, which has a specific multi-layer structure and a high gas permeation resistance.

11 Claims, 8 Drawing Figures

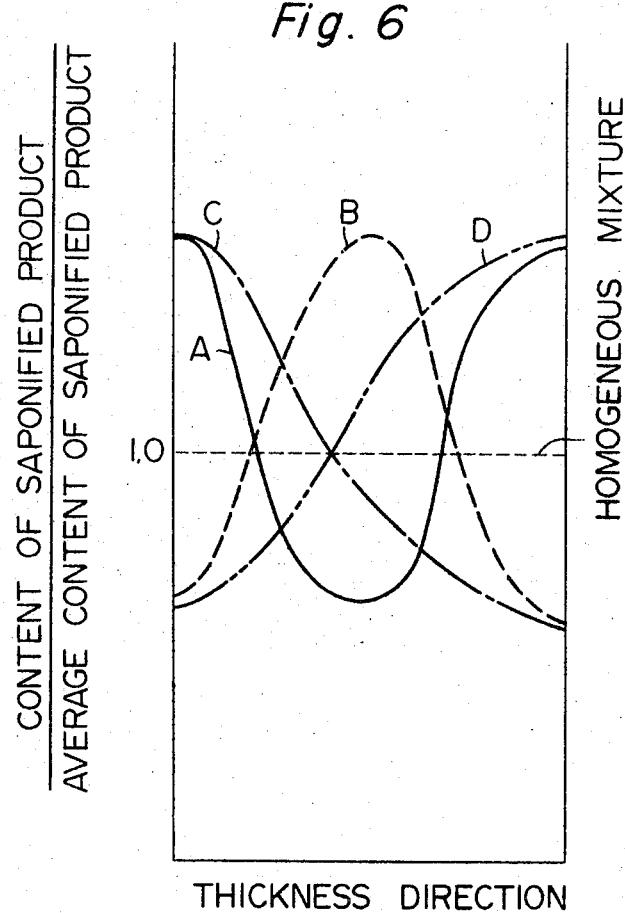
Fig. 6
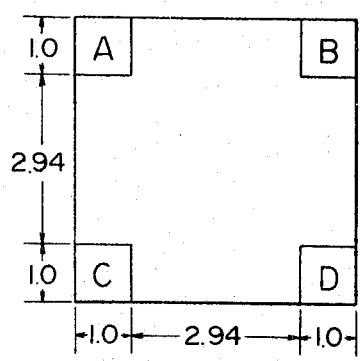
Fig. 7-A
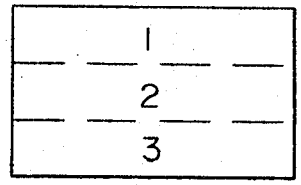
Fig. 7-B

RESINOUS COMPOSITIONS HAVING IMPROVED GAS PERMEATION RESISTANCE AND MOLDED STRUCTURES THEREOF

This invention relates to a resinous composition having an improved gas permeation resistance and a molded structure thereof. More particularly, it relates to a resinous composition having an improved gas permeation resistance which comprises a blend of a polyolefin such as low density polyethylene and an ethylene-vinyl acetate copolymer saponified product, and a molded structure composed of such resinous composition. More detailedly, the invention relates to a molded article having a structure characterized by a novel layer distribution, which is formed from a molten mixture comprising the above-mentioned polyolefin and ethylene-vinyl acetate copolymer saponified product, especially a molded article such as film, sheet, container or tube having a structure of a novel layer distribution excellent in the gas permeation resistance.

Polyolefins have heretofore been broadly used as packaging materials for foodstuffs and the like by dint of excellent mechanical strength and sanitariness. However, polyolefins are fatally defective in that permeability of gases such as oxygen and carbon dioxide gas is very high in polyolefins, and they are still insufficient in that foodstuffs cannot be preserved for a long time with use of containers or the like formed of polyolefins.

In order to improve the gas permeation resistance in polyolefins, methods have been proposed to copolymerize ethylene with various vinyl monomers. For instance, U.S. Pat. No. 3,419,654 discloses the use of a saponified product of an ethylene-vinyl acetate copolymer. Although such saponified product is advantageous over polyethylene in the point that its oxygen permeability is much smaller than that of polyethylene, it is still defective in that its water vapor permeability is high because of its hydrophilic characteristics and that its mechanical strength, especially impact resistance, is considerably low.

We have now found that when an ethylene-vinyl acetate copolymer saponified product and a polyolefin such as low density polyethylene, each having the defects such as mentioned above, are blended at specific ratios which will be detailed hereinbelow, there can be obtained resinous compositions in which permeability of ordinary gases such as oxygen, water vapor and carbon dioxide gas is extremely low and which are excellent in physical properties such as transparency and mechanical properties such as impact resistance, and that by dint of such excellent characteristics these resinous compositions can be suitably used especially as packaging materials for foodstuffs and the like.

It has also been found that when the above-mentioned polyolefin and ethylene-vinyl acetate copolymer saponified product are melt blended as specific ratios which will be explained hereinbelow and the molten mixture is extruded and molded under such specific extrusion conditions that the difference between the average flow rate of the polyolefin melt and the average flow rate of the ethylene-vinyl acetate copolymer saponified product melt is at least 1 cm/sec, there can be obtained a molded structure in which the polymer composition is different in the thickness direction but substantially identical in the plane direction and which has a layer structure wherein layers are continuous with respect to the plane direction; and that in such molded structure, there are formed layers containing the polyolefin at a ratio exceeding the average content and layers containing the ethylene-vinyl acetate copolymer saponified product at a ratio exceeding the average content and by dint of such specific layer structure, the molded structure exhibits an extremely low permeability of ordinary gases such as oxygen, water vapor and carbon dioxide gas and is excellent in mechanical properties such as stiffness and impact resistance and physical properties such as transparency.

In the instant specification, it is defined that in a hollow molded structure, the plane direction means the peripheral direction of the structure and the thickness direction means the direction vertical to said plane direction, namely the radial direction.

Accordingly, an object of this invention is to provide a novel resinous composition which has an excellent gas permeation resistance similarly against oxygen, water vapor, carbon dioxide gas, etc. and which is excellent in mechanical properties such as impact resistance, softness and toughness and physical properties such as transparency.

Another object of this invention is to provide a novel resinous composition of an excellent moldability which can readily be molten and extrusion molded into films, containers and other molded articles.

A further object of this invention is to provide a molding resinous composition which can be suitably used for formation of packaging materials for foodstuffs or the like such as films, bags, bottles and tubes.

Still another object of this invention is to provide a molded structure of a novel layer structure which exhibits an excellent gas permeation resistance similarly against oxygen, water vapor, carbon dioxide gas, etc. and which is excellent in mechanical properties such as stiffness and impact resistance.

A still further object of this invention is to provide a novel molded structure which has a layer structure in which the polymer composition is different in the thickness direction but substantially identical in the plane direction and layers are continuous with respect to the plane direction, in spite of the fact that the molded structure is formed from a molten mixture comprising a polyolefin and a saponified product of an ethylene-vinyl acetate copolymer.

A still further object of this invention is to provide a molded structure having a novel layer structure comprising layers containing a saponified product of an ethylene-vinyl acetate copolymer at a ratio exceeding the average content and layers containing a polyolefin at a ratio exceeding the average content, wherein every two adjacent layers are bonded to each other without any intermediate bonding layer of an adhesive.

A still further object of this invention is to provide a molding method according to which a molded structure of the above-mentioned novel layer structure can readily be prepared by only one extrusion molding apparatus.

In accordance with this invention, there is provided a resinous composition having an improved gas permeation resistance which comprising a mixture of 55 to 98 percent by weight of a crystalline polyolefin, particularly a low density polyethylene having a density of less than 0.929 g/cc, especially less than 0.928 g/cc, and 2 to 45 percent by weight of a saponified product of an ethylene-vinyl acetate copolymer having an ethylene content of 25 to 75 mole percent and a degree of saponification of at least 93 percent.

In accordance with one embodiment of this invention, there is provided a molded structure formed from a molten mixture containing (A) a polyolefin and (B) a saponified product of an ethylene-vinyl acetate copolymer having an ethylene content of 25 to 50 mole percent and a degree of saponification of at least 96 percent, at a weight ratio of A : B ranging from 95 : 5 to 75 : 25, said molded structure having a layer structure in which the polymer composition is different in the thickness direction but substantially identical in the plane direction and every two adjacent layer are bonded to each other without any intermediate bonding layer of an adhesive, wherein when said molded structure is divided in three layers in the thickness direction, at least one layer contains the ethylene-vinyl acetate copolymer saponified product in an amount expressed by the following formula $M_1 = m_1 X$ wherein X is the average content (percent by weight) of the ethylene-vinyl acetate copolymer saponified product in said molded structure, $m_1$ is a number of from 1.2 to 4, and $M_1$ is the content (percent by weight; which is sometimes called "concentration") of the ethylene-vinyl acetate copolymer saponified product in said layer, and at least one layer contains the ethylene-vinyl acetate copolymer saponified product in an amount expressed by the formula $M_2 = m_2 X$ wherein X is as defined above, $m_2$ is a number of from 0 to 0.9, and $M_2$ is the content (percent by weight) of the ethylene-vinyl acetate copolymer saponified product in said layer.

This invention will now be illustrated more detailedly.

RESINOUS COMPOSITION

The saponified product of an ethylene-vinyl acetate copolymer to be used in the molded structure of this invention is obtained by saponifying an ethylene-vinyl acetate copolymer having an ethylene content of 25 to 75 mole percent especially 25 to 50 mole percent so that the degree of saponification reaches at least 93 percent, especially at least 96 percent. In case the ethylene content exceeds 75 mole percent in the saponified copolymer, the gas permeation resistance (gas-barring property) against gases such as oxygen is lost, and the objects of this invention cannot be attained. Further, in a molded structure formed from a composition containing such saponified copolymer, it is difficult to obtain a layer structure in which the polymer composition is different in the thickness direction, and use of such saponified copolymer is not suitable for attaining the above-mentioned specific objects of this invention. In case the ethylene content of the saponified copolymer is less than 25 mole percent, the composition exhibits ia high hydrophilic property and its water vapor permeability becomes high with degradation of its properties in the molten form. Accordingly, use of such saponified copolymer is not suitable for attaining the objects of this invention.

In order for the molded structure to have an improved gas permeation resistance, it is essential that the degree of saponification should be at least 93 percent, especially at least 96 percent, in the ethylene-vinyl acetate copolymer saponified product.

A saponified product of an ethylene-vinyl acetate copolymer to be especially preferably used in this invention has an ethylene content of 25 to 50 mole percent and a degree of saponification of at least 99 percent.

The molecular weight of the ethylene-vinyl acetate copolymer saponified product to be used in this invention is not particularly critical, as far as it is in general within the range capable of forming films. In general, the viscosity of an ethylene-vinyl acetate copolymer saponified product is measured with use of a mixed solvent of 85 percent by weight of phenol and 15 percent by weight of water. In this invention, it is preferred that the ethylene-vinyl acetate copolymer saponified product used has an intrinsic viscosity [η], measured at 30°C. in such mixed solvent, of from 0.07 to 0.17 l/g. In the case of a saponified copolymer having an intrinsic viscosity [η] of lower than 0.07 l/g, the mechanical strength of the final molded article is insufficient, and in the case of a saponified copolymer having an intrinsic viscosity [η] exceeding 0.17 l/g, the moldability of the resulting resinous composition tends to be lowered.

In this invention, selection of a polyolefin among various thermoplastic resins and formation of a molten mixture by combining said selected polyolefin with an ethylene-vinyl acetate copolymer saponified product are very important for improving the gas permeation resistance in the final molded structure having the above-mentioned specific layer structure. According to this invention, the use of this combination of the polyolefin and saponified copolymer results in a molded structure having an excellent gas permeation resistance similarly against all of ordinary gases such as oxygen, water vapor and carbon dioxide gas and excellent physical properties such as good stiffness, high impact resistance and high transparency.

Any of polyolefins which have heretofore been used for molding of films or containers and the like broadly in the art may be used as the polyolefin in this invention. As such polyolefin, there may be employed homopolymers and copolymers of olefins expressed by the following formula

wherein R is a hydrogen atom or an alkyl group having up to 4 carbon atoms.

In order to obtain a molded article having sufficient mechanical strength from such polyolefin, it is essential that the olefin homopolymer or copolymer should be crystalline. As such crystalline polyolefin there may be mentioned, for instance, low density polyethylene, medium density polyethylene, high density polyethylene, isotactic polypropylene, crystalline ethylenepropylene copolymer, polybutene-1 and polypentene-1. Of course, in this invention the polyolefin to be used is not limited to olefin homopolymers and copolymers of two or more olefins, but copolymers comprising a small amount, for instance, up to 5 mole percent, of other ethylenically unsaturated comonomer within a range such as will not substantially damage the properties of the polyolefin, may be used. As such comonomer component, there may be exemplified vinyl chloride, vinyl acetate, acrylic acid, esters thereof, methacrylic acid and esters thereof.

In general, the molecular weight of the polyolefin is not particularly critical in this invention, as far as it is within the molded article-forming range. For instance, a polyolefin having an average molecular weight of from 5,000 to 400,000 (corresponding to a melt index MI (measured according to ASTM 1238) from 0.05 to 5.0 g/10 min.) is used preferably in general.

Polyolefins to be preferably used in this invention are, expressed in the order of importance, (I) a low density polyethylene having a density of from 0.917 to 0.929 g/cc, (II) a medium density polyethylene having a density of from 0.930 to 0.939 g/cc, (III) a high density polyethylene having a density of at least 0.940 g/cc, and (IV) an isotactic polypropylene.

In this invention, the use of a low density polyethylene having a density of less than 0.929 g/cc is especially preferred. More specifically, in accordance with a preferable embodiment of this invention, a low density polyethylene is especially selected among various thermoplastic resins, and by a simple operation of blending this low density polyethylene with a saponified product of an ethylene-vinyl acetate copolymer, there can readily to obtained a composition having a desired combination of high gas permeation resistance, high impact resistance and high transparency. Other polyethylenes having a density of greater than 0.929 g/cc, for instance, medium pressure process polyethylenes or low pressure process polyethylenes (high density polyethylenes), have a tendency to give, in general, a poor transparency when blended with an ethylene-vinyl acetate copolymer saponified product. Further, a vessel molded from a resinous composition comprising such polyethylene is inferior in softness characteristics such as squeezing property. Of course, in this invention, in preparing containers of which transparency is not required or containers of which a rigid property is required, it is possible to employ medium density polyethylene, high density polyethylene and isotactic polypropylene. In this invention, when a combination of a polyolefin with the saponified ethylene-vinyl acetate copolymer is used, by employing the molding operation procedures which will be described below, it is made possible to manifest very prominently the characteristic feature in the molded structure of this invention, that is, the feature of the specific layer structure constructed of layers differing from each other in the resin composition, and to improve such properties as gas permeation resistance, transparency, and impact resistance greatly.

It has been disclosed in the specification of Japanese Patent Publication No. 31758/70 that when a saponified product of an ethylene-vinyl acetate copolymer is blended with an acrylonitrile-butadiene copolymer, the impact resistance of the saponified ethylene-vinyl acetate copolymer is improved. However, the specification of said Japanese Patent Publication clearly teaches that since there is no complete compatibility between the ethylene-vinyl acetate copolymer saponified product and acrylonitrile-butadiene copolymer the resulting resinous blend is semi-transparent. Thus, it is shown that this resinous composition has a defect with respect to transparency.

Attempts to obtain a resinous composition excellent in gas permeation resistance, impact resistance and transparency by graft or block polymerizing an ethylene-vinyl acetate copolymer saponified product with other monomer or polymer have been known. For instance, the specification of Japanese Patent Publication No. 82275/70 teaches that when $\epsilon$-caprolactam is added to a saponified product of an ethylene-vinyl acetate copolymer and the mixture is polymerized under heat, there is formed a blocked, grafted or partially cross-linked product composed of combined saponified copolymer and poly-$\epsilon$-caprolactam and that the above-mentioned characteristics are improved in the resulting resinous product. Further, in Chemical Abstracts, vol. 73 (1970), 15729 a, it is disclosed that when a high density polyethylene not previously masticated and a saponified product of an ethylene-vinyl acetate copolymer are kneaded together with a free radical-forming catalyst under heat and pressure to form a block-graft copolymer, there is obtained a product excellent in gas permeation resistance, anti-stress-cracking property and resistance against thermal shrinkage.

However, each of these known techniques is industrially and economically disadvantageous in that special operations and materials are required for accomplishing the block or graft copolymerization, and each of resinous compositions obtained according to such known techniques cannot escape from a defect of degradation in moldability because the cross-linked structure should inevitably be introduced at the block or graft copolymerization.

In contrast to these known techniques, when a low density polyethylene is used (in accordance with the above preferable embodiment of this invention), a molded structure having the above-mentioned desired combination of excellent gas permeation resistance, impact resistance and transparency can be obtained merely by blending and melting, and the molding of the resinous composition can be performed very easily. This feature is quite unobvious and unexpected from the conventional knowledge that in case polyolefin is used in combination with a saponified product of an ethylene-vinyl acetate copolymer, it is necessary to perform the block- and graft-copolymerization between both polymers.

Of course, in a molded product of the above-mentioned specific multi-layer structure according to this invention, it is possible to improve mechanical properties such as stiffness, tensile strength and tear strength by employing high density polyethylene or isotactic polypropylene.

In the resinous composition of this invention, it is especially important that 55 to 98 percent by weight of a polyolefin, especially a low density polyethylene such as mentioned above, is mixed with 2 to 45 percent by weight of a saponified product of an ethylene-vinyl acetate copolymer. Data of permeation resistance against various gases, tensile elasiticity, strength at breakage, elongation at breakage and transparency of films obtained by melting and extrusion molding resinous compositions formed by blending a low density polyethylene and an ethylene-vinyl acetate copolymer saponified product at various ratios are shown in Table 2 of Example 2 given hereinbelow.

From this Table 2, it can readily be understood that a film formed from a resinous composition obtained by mixing 55 to 98 percent by weight of a low density polyethylene and 2 to 45 percent by weight of an ethylene-vinyl acetate copolymer saponified product retains a permeability of oxygen or carbon dioxide gas at an extremely low level as compared with a film composed of the low density polyethylene alone, and at the same time, the water vapor permeability in a film formed from such resinous composition is about 1/10 of the vapor permeability in a film composed of the saponified ethylene-vinyl acetate copolymer alone.

Results of the impact resistance test (bottle-falling test) made on bottles molded from resinous compositions obtained by mixing a low density polyethylene and a saponified product of an ethylene-vinyl acetate copolymer at various ratios are shown in Table 10 of Example 10 given hereinbelow.

From Table 10, it can readily be understood that by forming a resinous composition by blending the low density polyethylene and saponified ethylene-vinyl acetate copolymer at a ratio within the range specified in this invention, it is made possible to improve greatly the impact resistance as compared with the case of the single use of the saponified ethylene-vinyl acetate copolymer, while controlling the permeability of oxygen, carbon dioxide gas and water vapor at an extremely low level.

Further, as compared with the single use of the saponified ethylene-vinyl acetate copolymer, the transparency and physical properties such as toughness and softness can be improved by maintaining the mixing ratio of the low density polyethylene and saponified copolymer within the above-mentioned range.

A resinous composition especially suitable for attaining the objects of this invention consists essentially of 65 to 95 percent by weight of a low density polyethylene and 5 to 35 percent by weight of a saponified product of an ethylene-vinyl acetate copolymer.

In the molded structure having the specific layer distribution according to this invention, it is important that the molded structure should be molded from a molten mixture comprising (A) the above-mentioned polyolefin and (B) the above-mentioned saponified ethylene-vinyl acetate copolymer at a weight ratio of A : B ranging from 95 : 5 to 75 : 25, especially from 95 : 5 to 80 : 20. In this embodiment of this invention, by maintaining the mixing ratio of the polyolefin (A) and the saponified ethylene-vinyl acetate copolymer (B) within the above-mentioned range, it is made possible to obtain a molded structure having a specific multi-layer structure in which the polymer composition is different in the thickness direction but substantially identical in the plane direction and the layers are continuous with respect to the plane direction. For instance, when the ratio of the saponified ethylene-vinyl acetate copolymer in the molten mixture is less than 5 percent by weight or greater than 25 percent by weight, it is difficult to form definitely in the resulting molded structure (a) layers which contain predominantly the saponified ethylene-vinyl acetate copolymer, that is, layers which contain said saponified product in an amount expressed by the formula $M_1 = m_1X$ (in which $m_1$ is a number of from 1.2 to 4) and (b) layers which contain predominantly the polyolefin, that is, layers which contain the saponified product in an amount expressed by the formula $M_2 = m_2X$ (in which $m_2$ is a number of from 0 to 0.9). Further, in either of the above two cases, it is difficult to maintain both the permeability of oxygen and carbon dioxide gas and the permeability of water vapor coincidentally at desired levels.

The mixing of the polyolefin and saponified ethylenevinyl acetate copolymer may be accomplished by a method known per se, and any particular limitation is not imposed on the mixing method. Namely, it is sufficient to blend the polyolefin and saponified copolymer in the powdery or granular state at room temperature by means of a mixer or the like prior to the melt molding operation, and an operation of mixing them in the molten state is not especially required. However, if desired, they are melt blended by means of a customary pelletizer or the like.

The resinous composition of this invention may further comprise other polymers, for instance, other poly-$\alpha$-olefins, olefin copolymers, vinyl polymers, diolefin polymers and olefin-vinyl compound copolymers, in such amounts as will not give substantially any bad influences to the gas permeation resistance, impact resistance and transparency of the resulting composition, for instance, in amounts of up to 10.0 parts by weight per 100 parts by weight of the mixture of the polyolefin and saponified copolymer.

In the preparation of the resinous composition of this invention, when the final product is used as a packaging material for foodstuffs, it is preferable to conduct the preparation without use of so called additives. However, if desired, it is possible to incoporate known additives such as ultraviolet absorbents, stabilizers, lubricants, pigments and antistatic agents.

MOLDING PROCESS

The resinous compositions of this invention may be molded into optional molded articles such as films, sheets, tubes, bottles and tanks by a melt-molding method known per se, for instance, a method employing a melt-extruder. The melt extrusion temperature adopted during the molding operation differs greatly depending on such factors as the properties of the extruder used, the molecular weights and mixing ratios of both resins and the ethylene content of the saponified copolymer, but generally speaking, it is preferable that the melt extrusion is conducted at a temperature ranging from 70° to 200°C. Since the resinous composition of this invention is a mixture of substantially linear polymers, in general, it can be melt-extruded very easily, unlike the above-mentioned conventional compositions composed of block or grafted copolymers.

The novel molded structure of the specific layer distribution according to this invention can be usually formed by melting the above-mentioned resinous composition in the blended state, and extrusion molding the molten mixture (i) at a temperature of 170° to 250° C., (ii) under a pressure of 10 to 300 Kg/cm² and (iii) under such extrusion condition that the difference between the average flow rate ($\bar{v}_1$) of the melt of said polyolefin and the average flow rate ($\bar{v}_2$) of said ethylene-vinyl acetate copolymer saponified product is at least 1 cm/sec.

According to this preferable method of this invention, by conducting the molding so that the above three conditions (i), (ii) and (iii) will be satisfied, it is possible to form both layers (a) in which the saponified ethylene-vinyl acetate copolymer is predominantly contained and layers (b) in which the polyolefin is predominantly contained, in a flow of the resin melt coming out of the die head of the extruder.

In case the extrusion molding temperature is lower than 170°C., since the molding temperatue approximates the melting point of the saponified ethylene-vinyl acetate copolymer, in the resulting molded product it is impossible to attain a layer structure in which layers are continuous with respect to the plane direction. Further, in case the extrusion molding temperature is higher than 250°C., the molten resin flows are intermingled too closely and it is difficult to obtain a molded product having the specific multi-layer structure specified in this invention, and degradation is caused by oxidation or thermal decomposition of the resins, especially the saponified ethylenevinyl acetate copolymer.

At an extrusion molding pressure lower than 10 Kg/cm², it is difficult to attain the average flow rate difference of at least 1 cm/sec between the average flow rate ($\bar{v}_1$) of the polyolefin melt and the average flow rate ($\bar{v}_2$) of the saponified copolymer melt. On the other hand, at an extrusion molding pressure exceeding 300 Kg/cm², intermingling of the resin flows is brought about and it is difficult to form the specific multilayer structure in the resulting molded structure.

In this invention, it is especially important that the extrusion conditions are so selected that the value expressed by the following formula $$|\bar{v}_2 - \bar{v}_1| = \Delta \bar{v}$$

is at least 1 cm/sec, preferably 1 to 10 cm/sec. In the instant specification and claims, the average flow rate ($\bar{v}$) is defined to be the value expressed by the following formula $$\bar{v} = (Q/3.6d)/\pi R^2$$

wherein Q stands for the amount (Kg/hr) of the resin melt extruded from the die of the extruder at prescribed temperature and pressure, d designates the density (g/cc) of the resin melt and R represents the radius (cm) of the die passage.

The density of the resin melt can be determined by calculating the amount extruded $\eta$ (cc) at prescribed pressure (e.g., 50 Kg/cm²) and temperature by means of, for instance, a visco meter of the constant pressure extrusion type according to the following equation $$\eta = HA - \pi r^2 l$$

wherein H is the length (cm) of the lowering of the plunger, A is the cross-sectional area (cm²) of the barrel, r is the orifice radius (cm), and $l$ is the orifice length (cm),
measuring the weight W (g) of $\eta$ cc of the extrudate, and conducting the calculation according to the following formula $$d = W/\eta \ (g/cc).$$

In this invention, conditions for adjusting the $\Delta\bar{v}$ value to at least 1 cm/sec are attained, for instance, by the following procedures:

1. With use of a melt extruder of the same structure and capacity, the degree of dependency of the average flow rate on temperature and pressure is determined with respect to each of the starting polyolefin and saponified ethylene-vinyl acetate copolymer, respectively, and the temperature and pressure conditions are decided so that the difference ($\Delta\bar{v}$) between the average flow rate ($\bar{v}_1$) of the polyolefin melt and the average flow rate ($\bar{v}_2$) of the saponified copolymer melt will be at least 1 cm/sec.

2. The structure or dimension of the extruder is changed or modified so that under prescribed temperature and pressure conditions the value $\Delta\bar{v}$ will be at least 1 cm/sec. For instance, since the radius of a passage for the resin melt in the die of the extruder gives a great influence to the flow rate of the resin melt, the condition of the value $\Delta\bar{v}$ being at least 1 cm/sec is attainable by adjusting the radius of the above passage within a suitable range.

3. It is possible to satisfy the condition of the $\Delta\bar{v}$ value being at least 1 cm/sec by combining the above procedures (1) and (2) appropriately.

In conducting the molding method of this invention, if under such conditions as will give the $\Delta\bar{v}$ value of less than 1 cm/sec, it is difficult to obtain a molded structure having the specific multi-layer structure specified in this invention. On the other hand, when the $\Delta\bar{v}$ value is too great, a good balance is not obtained between the flows of the molten polyolefin and of the molten saponified copolymer and hence, the molding tends to be difficult in some cases. In view of the foregoing, it is desired to select such conditions as will give the $\Delta\bar{v}$ value ranging from 1 to 10 cm/sec.

As far as the above condition is satisfied, any of known melt extruders may be optionally used in this invention. As such extruder there may be mentioned an extruder comprising a cylinder zone constructed of a passage equipped with a rotary screw and a resin-feeding opening connected with said passage; a die provided with a passage connected with said passage of the cylinder zone; and a die head provided with an extrusion opening attached to the end point of said die and connected with the die passage. it is important that care must be taken so that the resin melt formed in the cylinder zone of the extruder is allowed to move through passages of the die and die head in the form of a laminar flow. In other words, it is important that substantial mingling of molten resin flows is not caused to occur. Accordingly, it is preferred to employ as the screw a full-flighted screw such as a metering screw, but in the case of an ordinary screw generally called a mixing screw, such as a screw of the Dalmadge type, if it has five or less threads in the mixing zone, it is possible to obtain a molded structure having the specific multi-layer structure specified in this invention by suitably choosing the extrusion conditions of such screw, for instance, the diameter of the screw or the radius R of the die passage. In order to increase the effect of kneading or mixing resins, or to prevent incorporation of foreign substances into a molded article, such members as a breaker plate and a screen are mounted at the die portion of the extruder in some cases in the art of the extrusion molding. In this invention, however, provision of such members on the die portion is not preferred because it prevents the molten resins from flowing in the laminar form. But if desired, it is permissible to use a breaker plate having less than 300 holes, or less than 5 screens of 120 mesh, and in such case, if the provision place of such breaker plate or screens, the radius R of the die passage or other extrusion condition is suitably adjusted, it is possible to obtain a molded structure having the multi-layer structure specified in this invention. Furthermore, in case the $\Delta\bar{v}$ value is within the above-mentioned range but relatively small, by employing an extruder having a die passage of a relatively great length, it is made possible to manifest the abovementioned specific layer structure more prominently in the resulting molded structure.

As the die head, any of a T-die head (or a slit die head) used for the ordinary film-forming method, a ring die head used for the inflation film-forming method, and a die head of the cross-head or spider type used for formation of containers by blow molding may be used in this invention.

The preliminary mixing of a polyolefin and an ethylenevinyl acetate copolymer saponified product may be carried out according to an optional method known per se, and the method for the primary mixing is not particularly critical in this invention. That is, it is sufficient to mix the polyolefin and saponified copolymer in the powdery or granular state at room temperature merely by means of a mixer or the like prior to the melt molding, and any operation of mixing them in the molten state is not especially required. However, it is possible to employ a mixture which has once been molten and blended, such as flashes or fins formed during the molding operation.

The operational procedures for molding the composition of this invention into films, sheets, containers, tubes pipes and the like are well known in the art except for the above-mentioned points. Therefore, any special description is not given to these known procedures in the instant specification. These procedures for the molding operation are detailed in, for instance, the following literature references:

Keiji Oshima and Shoji Seto; "Methods of Molding and Processing Synthetic Resins" High Polymer Publishing Co., Inc., Kyoto (1956);

Keiji Sawada; "Extrusion Molding of Plastics and Its Application" Seibundo Shinkosha, Tokyo (1966); David A. Jones and Thomas W. Mullen; "Blow Molding" Rheinhold, New York (1961); and Gerhard Schenkel; "Plastics Extrusion Technology and Theory" American Elsevier Publishing Co. Inc., New York (1966).

STRUCTURE OF MOLDED PRODUCT

The molded product of this invention has, in general, a thickness of more than $60\mu$, especially from $150\mu$ to 6 mm, and is useful as a molded structure having two- or three-dimensional planes. Such molded structure includes films sheets, embossed sheets, tubes, pipes and containers such as bags, bottles and tanks.

A preferable molded structure of this invention has a specific multi-layer structure characterized in that the polymer composition is different in the thickness direction but substantially identical in the plane direction and layers are continuous with respect to the plane direction. It has heretofore been known to obtain fibrillated fiber-like, tapelike molded articles by mixing two or more thermoplastic polymers having no compatibility with each other, melt extruding the mixture, cooling and solidifying the extrudate and drawing the solidified extrudate (see, for instance, Japanese Patent Publications No. 9651/60 and No. 5212/64). In molded articles obtained by these known methods, two or more thermoplastic polymers are present in the form of independent phases where the mingling of the polymers is not at all observed, and the peeling strength at the interfacial plane between the adjacent phases is substantially zero. Further, at least one of two or more of such phases tends to form a discontinuous, dispersed phase. Even if both phases are present in the continuous form, it is difficult to obtain a molded structure in which both phases are continuous with respect to the plane direction.

In contrast, according to a preferable embodiment of this invention, it is possible to obtain a molded structure having the above-mentioned specific multi-layer structure by selecting (A) a polyolefin as one resin and (B) a saponified product of an ethylene-vinyl acetate copolymer as the other resin, mixing them at a weight ratio of A : B raning from 95 : 5 to 75 : 25, and subjecting the mixture to the melt extrusion molding under the above-mentioned specific extrusion and molding conditions.

It can be confirmed by various experiments that a preferable molded structure of this invention is characterized in that the polymer composition is different in the thickness direction but substantially identical in the plane direction and each of the layers is continuous with respect to the plane direction.

For better illustration of this invention, description will now be made by reference to the accompanying drawings wherein.

FIG. 6 is a diagramatical graph illustrating the distribution of the saponified ethylene-vinyl acetate copolymer in the thickness direction in a molded structure of this invention; and FIGS. 7-A and 7-B are views illustrating the method for collecting samples in Examples of the instant specification, FIG. 7-A being a top view of samples to be collected (A, B, C and D), and FIG. 7-B being a view illustrating the cross-section of the sample to be divided into three layers 1, 2 and 3.

Figure 1:
FIG. 1 is an electronmicroscopic photo showing the cross-section in the thickness direction of a molded structure of this invention.
Figure 2:
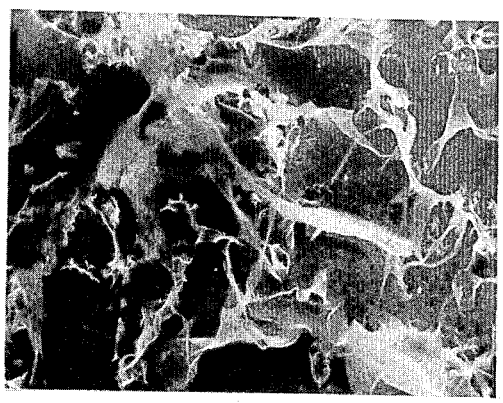
FIG. 2 is an electronmicroscopic photo showing the cross-section in the plane direction of a molded structure of this invention.

When the cross-sections in the thickness direction and plane direction of a preferable molded article of this invention are observed under an electron microscope, the presence of a layer structure extending continuously in the plain direction can readily be confirmed. FIGS. 1 and 2 are electromicronscopic photos showing the cross-sections in the thickness and plane directions of the body portion of a bottle prepared by the method described below. In FIG. 1, the upper "striped" portion is of the saponified ethylene-vinyl acetate copolymer and the "sea-like" portion seen in the lower part of the photo is of the low density polyethylene. In FIG. 2, it is confirmed that in the plane direction the saponified ethylenevinyl acetate copolymer is not present in the "striped" form but in the "plane-like" form (namely, in the continuous phase).

Electonmicronscopic photos were taken by the following method:

i. The sample was cut in a prescribed size in either the thickness or plane direction by means of a diamond knife.

ii. A small amount of gold was vacuum-plated on each cut face (i.e., face to be observed).

iii. Each face to be observed was enlarged by a scanning electron microscope and photographed.

The magnification was 100 in FIG. 1 and 300 in FIG. 2. In FIG. 1, the vertical direction in the photo is the thickness direction of the body portion of the bottle (the upper part corresponds to the outer side of the bottle and the lower part corresponds to the inner side of the bottle), and the horizontal direction in the photo is the direction vertical to the resin flow direction. In FIG. 2, the vertical direction in the photo is the direction parallel to the resin flow direction and the horizontal direction in the photo is the direction vertical to the resin flow direction.

Figure 3:
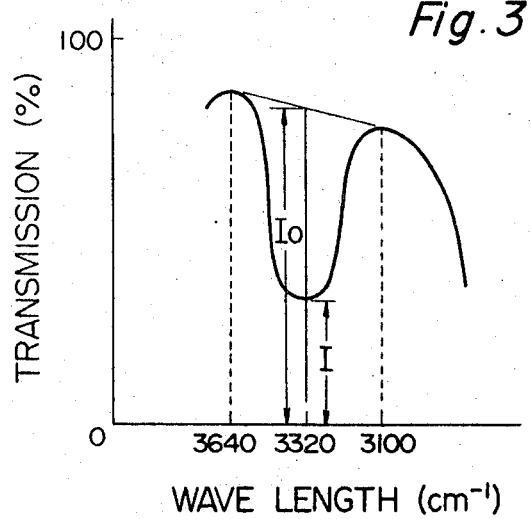
FIG. 3 is a curve illustrating the method for determining the Io and I values at a wavelength of 3320 $cm^{-1}$ from the infrared absorption spectrum.
Figure 4:
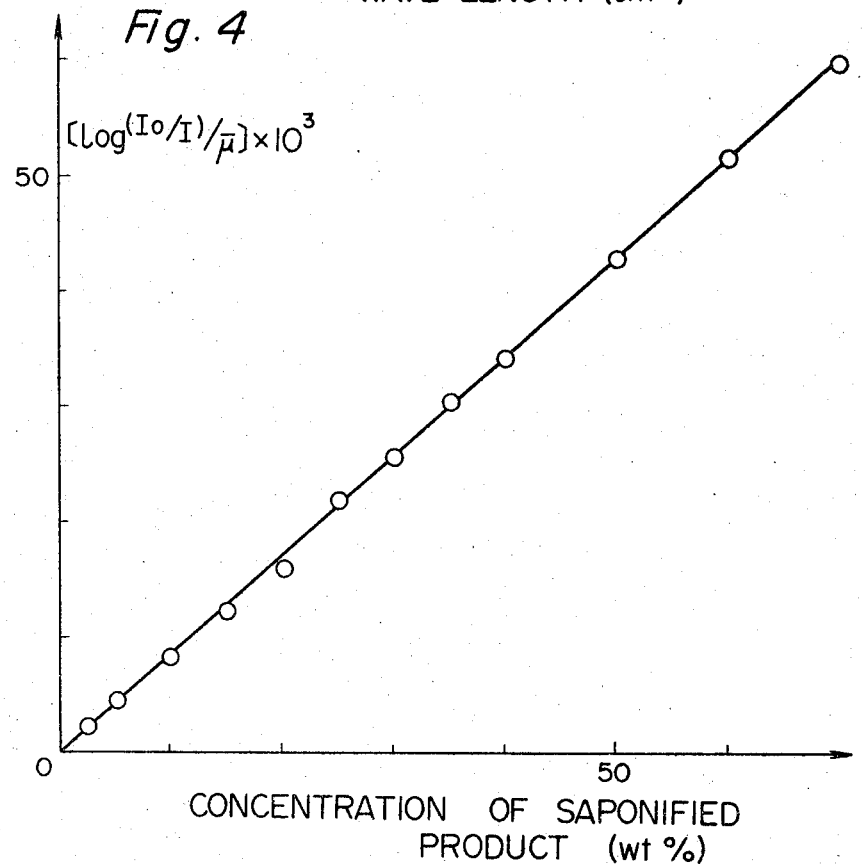
FIG. 4 is a graph illustrating one example of the calibration curve for calculating the concentration of the saponified ethylene-vinyl acetate copolymer present in each layer of a molded structure of this invention.
Figure 5:
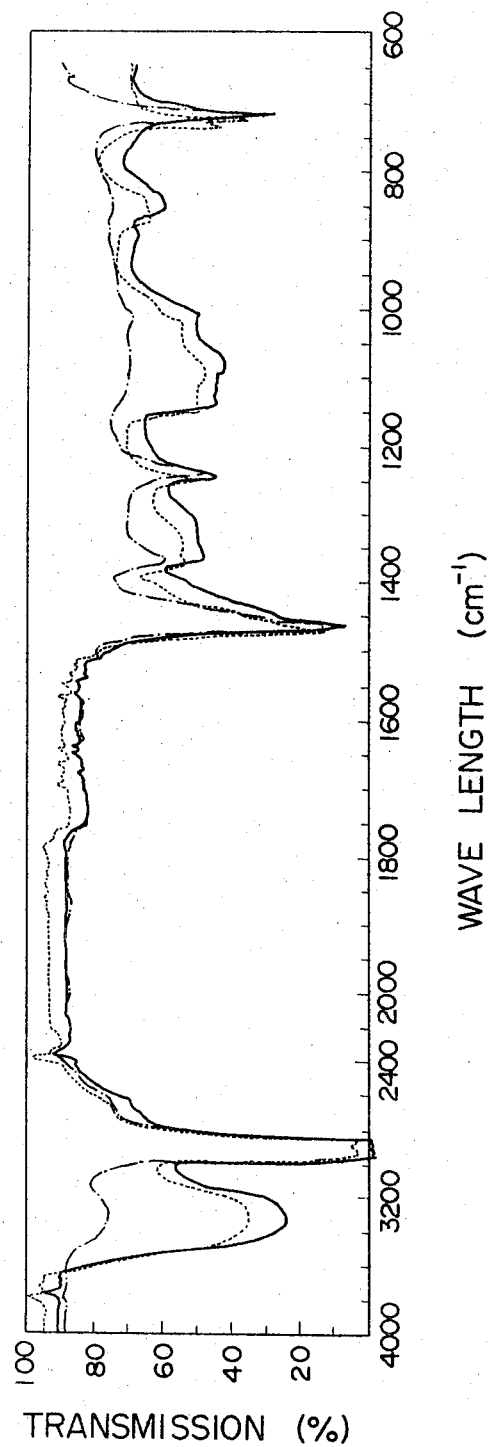
FIG. 5 is a graph illustrating the infrared absorption spectrum of each layer of a molded structure of this invention.

The fact that in the molded structure the resins are distributed so that the polymer composition is different in the thickness direction can be confirmed by taking out an optional layer from the molded structure by mechanical peeling means or the like and examining the infrared absorption spectrum of the sample. For instance, the saponified ethylene-vinyl acetate copolymer exhibits an absorption at 3320 cm$^{-1}$ owing to the presence of the hydroxyl group, and therefore, the concentration of the saponified copolymer present in an optional layer of the molded structure can be determined by the following method:

i. One polyolefin (A) and a saponified product of an ethylene-vinyl acetate copolymer (B) whose ethylene content and degree of saponification were known were preliminarily blended (dry-blended) at a weight ratio of A : B ranging from 97.5 : 2.5 to 30 : 70, and then, the melt blending was conducted at 220°C. in a nitrogen atmosphere for 15 minutes with use of a Banbury mixer (the rotation rate of the rotor being 45 rpm). As a result of the microscopic observation, it was confirmed that in all of the mixtures obtained under such conditions the components A and B were mixed homogeneously.

ii. Each of the so formed mixtures was heated at 195°C. under a pressure of 10 Kg/cm$^2$ to 300 Kg/cm$^2$ for 2 minutes by employing a high pressure press and formed into a film having a thickness of 5 to 150$\mu$.

iii. The infrared absorption curve of each of the so formed films was obtained under conditions of a temperature of 20°C. and a relative humidity of 40 percent by means of an infrared spectrophotometer.

iv. In each infrared absorption curve thus obtained, the point at 3100 cm$^{-1}$ was connected with the point at 3640 cm$^{-1}$ by a line as diagramatically illustrated in FIG. 3. As illustrated in FIG. 3, the values of Io and I were read from the crossing point of said line and the line vertical to the wavelength axis at 3320 cm$^{-1}$ and from the crossing point of said vertical line and the absorption curve, respectively.

v. According to the following known equation.

$$\log(\mathrm{Io}/\mathrm{I})\bar{\mu} = KC$$

wherein $\bar{\mu}$ is the average thickness ($\mu$) of the film used for the infrared absorption measurement, C designates the concentration (percent by weight) of the saponified ethylene-vinyl acetate copolymer, and K is a constant, the values of $(\log(\mathrm{Io}/\mathrm{I}))\sqrt{\bar{\mu}}$ and C were plotted to obtain the calibration curve. FIG. 4 illustrates an instance of such calibration curve obtained in the mixture system of a low density polyethylene (1A) having a density of 0.920 g/cc (determined according to ASTM D-1505) and a saponified product of an ethylene-vinyl acetate copolymer (1B) having an ethylene content of 25.4 mole percent and a degree of saponification of 99.2 percent. From FIG. 4, the calibration curve expressed by the formula $$\log(\mathrm{Io}/\mathrm{I})/\bar{\mu} = (0.85 \times 10^{-3})C$$

was obtained with respect to the mixture system of above components 1A and 1B. In the same manner as described above, the calibration curve expressed by the formula $$\log(\mathrm{Io}/\mathrm{I})/\bar{\mu} = (0.85 \times 10^{-3})C$$

was obtained with respect to the mixture system of a high density polyethylene (2A) having a density of 0.945 g/cc (determined according to ASTM D-1505) and said saponified copolymer (1B). Similarly, the calibration curve expressed by the formula $$\log(\mathrm{Io}/\mathrm{I})/\bar{\mu} = (0.85 \times 10^{-3})C$$

was obtained with respect to the mixture system of an isotactic polypropylene (3A) having a density of 0.914 g/cc (determined according to ASTM D-1505) and said saponified copolymer (1B). Similarly, the calibration curve expressed by the formula $$\log(\mathrm{Io}/\mathrm{I})/\bar{\mu} = (0.70 \times 10^{-3})C$$

was obtained with respect to the mixture system of said low density polyethylene (1A) and a saponified ethylene-vinyl acetate copolymer (2B) having an ethylene content of 30.5 mole percent and a degree of saponification of 98.1 percent. Still further, the calibration curve expressed by the formula $$\log(\mathrm{Io}/\mathrm{I})/\bar{\mu} = (0.42 \times 10^{-3})C$$

was obtained with respect to the mixture system of the low density polyethylene (1A) and a saponified ethylene-vinyl acetate copolymer (3B) having an ethylene content of 49.4 mole percent and a degree of saponification of 96.3 percent.

vi. Parts, detailed in Examples given hereinbelow, of a molded article obtained according to the method of this invention were divided into three layers in the thickness direction according to the sampling method described hereinbelow, and each layer was molded into a film by the method described in ii) above.

vii. The infrared absorption curve of each layer obtained in vi) above was obtained under the conditions with use of the same apparatus as in iii) above. in FIG. 5 are illustrated infrared absorption curves of the layers obtained by dividing the body portion of a bottle prepared by the method detailed hereinbelow, into three layers in the thickness direction. In FIG. 5 the solid line indicates the infrated absorption curve of the first layer, the dotted line indicates that of the second layer, and the chain line indicates that of the third layer.

viii. With respect to each of the so obtained infrared absorption curves, the values Io and I were determined from the absorption at 3320$^{-1}$ cm in the same manner as in iv) above, and from these Io and I values and the average thickness ($\bar{\mu}$) of each film, the value of $(\log(\mathrm{Io}/\mathrm{I}))\sqrt{\bar{\mu}}$ was calculated. The calculated value was put into the calibration curve equation of the corresponding mixture system described in v) above, and the concentration of the saponified ethylene-vinyl acetate copolymer was calculated. When a molded structure of this invention is divided into three layers in the thickness direction, (a) at least one layer contains the saponified ethylene-vinyl acetate copolymer in an amount greater than the average content (X), namely in an amount expressed by the formula $M_1 = m_1 X$ (in which $m_1$ is a number ranging from 1.2 to 4), and (b) at least one layer contains the saponified copolymer in an amount less than the average content (X) namely in an amount expressed by the formula $M_2 = m_2 X$ (in which $m_2$ is a number ranging from 0 to 0.9).

The layer (a) in which the saponified ethylene-vinyl acetate copolymer is predominantly distributed may be present in either one or both of the surface layers of the molded structure, or in the form of an intermediate layer. FIG. 6 is a view illustrating diagramatically the distribution in the thickness direction of the saponified ethylene-vinyl acetate copolymer in a molded structure of this invention, wherein the ordinate indicates the ratio of the content of the saponified copolymer at an optional point in the thickness direction to the average content of the saponified copolymer, and the abscissa indicates the dimension in the thickness direction of the molded structure. The curve A is of a molded structure in which the saponified copolymer is predoninantly distributed in both surface layers, the curve B is of a molded structure in which the saponified copolymer is predominantly distributed in the intermediate layer, and the curves C and D are of molded structures in which the saponified copolymer is predominantly distributed in either of the surface layers.

Such four types of the distribution of the saponified ethylene-vinyl acetate copolymer may be formed, for instance, by choosing and combining appropriately the average flow rate of the polyolefin melt, the average flow rate of the melt of the ethylene-vinyl acetate copolymer saponified product and the conditions of the melt extrusion of the resinous composition.

For instance, when the combination of both resins or extrusion conditions are so chosen that the average flow rate of the polyolefin melt is higher than the average flow rate of the saponified copolymer melt, and when the molding is conducted with use of a die head in which the melt is not divided, such as a slit die head, the resulting sheet or film is characterized by the saponified copolymer distribution in the thickness direction such as shown by curve A in FIG. 6. A sheet or film molded under such extrusion conditions or with such combination of both resins that the average flow rate of the polyolefin melt is lower than that of the saponified copolymer melt, with use of a die head in which the melt is not divided, such as a slit die head, is characterized by the saponified copolymer distribution in the thickness direction such as shown by curve B in FIG. 6. Under such extrusion conditions or with such combination of both resins that the saponified copolymer distribution of curve A or B is obtained as mentioned above, if a pipe, tube, bottle, tank or film is molded with use of a die head in which the melt is divided, such as a spider type die head, the resulting molded structure exhibits such a curve of the saponified copolymer content as curve C or D in FIG. 6. Even when there is used a die head in which the melt is divided, such as a spider type die head, a molded pipe, tube, bottle, tank or film whose curve of the saponified copolymer distribution in the thickness direction is such as curve A or B can be obtained by making the die land portion of such die longer.

A preferable molded structure of this invention can be clearly distinguished from a blend of a polyolefin and an ethylene-vinyl acetate copolymer saponified product and a laminated structure formed from a polyolefin and an ethylene-vinyl acetate copolymer saponified product. In a molded structure obtained by laminating a layer of a polyolefin and a layer of a saponified ethylene-vinyl acetate copolymer, since there is no bondability between the two resins, it is necessary to bond both the layers with an aid of an especial adhesive. Such laminated structure may be excellent in the gas permeation resistance, but defects are brought about with respect to the peel strength, heat resistance, water resistance, hot water resistance, impact resistance and other properties. A molded structure composed of a homogeneous blend of a polyolefin and a saponified product of an ethylene-vinyl acetate copolymer tends to exhibit values of the oxygen permeation resistance, carbon dioxide gas permeation resistance and water vapor permeation resistance, each of which approximates the arithmetic mean of the values of a molded structure of the polyolefin alone and of a molded structure of the saponified copolymer alone.

In contrast, in a preferable molded structure of this invention, a layer of a low permeability of a gas such as oxygen or carbon dioxide gas in which a saponified ethylene-vinyl acetate copolymer is predominantly distributed and a layer of a high water vapor permeation resistance in which a polyolefin is predominantly distributed are tightly and integrally bonded without any interfacial adhesive layer. By dint of this structural characteristics, the preferable molded article of this invention can possess a permeation resistance against oxygen, carbon dioxide gas and water vapor, which is almost comparable to that of a laminated structure of a polyolefin and a saponified ethylene-vinyl acetate copolymer, and mechanical properties such as peel strength and impact resistance, almost comparable to those of a molded structure of a blend of a polyolefin and a saponified ethylene-vinyl acetate copolymer.

Thus, the molded structure of this invention in the form of a film or a film laminated with a film of other synthetic resin or a metal foil is useful as a film container for preserving foodstuffs, medicines, etc. for a long period of time, and when molded in the form of a tube, bag, bottle or tank, the molded structure of this invention is useful as a vessel or container for preserving foodstuffs, medicines, etc.

This invention will now be illustrated in more detail by reference to Examples.

In Examples 13 to 23, each of sample layers was collected by the following sampling method:

i. A disc of a diameter of 7.0 cm was taken from a prescribed portion (indicated in each Example) of the molded article, and the oxygen permeability was determined.

ii. The disc-like sample after the oxygen permeability test was dried in vacuo at 50°C.

iii. The dried disc-like sample was cut into four rectangular parallelopipeds A, B, C and D as illustrated in FIG. 7-A.

iv. Each of the four samples was divided into 3 layers in the thickness direction (namely, the direction parallel to the plane) (see FIG. 7-B). The three layers were designated as follows:

a. In case the molded article was a sheet;
  layer 1 - - - surface portion closely contacted with a take-up roll
  layer 2 - - - intermediate portion
  layer 3 - - - surface portion not contacted with a take-up roll b. In case the molded article was a film, bottle or pipe formed by inflation molding;
  layer 1 - - - portion corresponding to the outer portion of the form of the molded article before cutting (outside portion of the cylindrical form)
  layer 2 - - - intermediate portion layer 3 - - - portion corresponding to the inner portion of the form of the molded article before cutting (inside portion of the cylindrical form)

Accordingly, when the values of the saponified ethylene-vinyl acetate copolymer concentration (content) given with respect to layers 1, 2 and 3 of the same alphabetic letter (one of A, B, C and D) are compared in Tables given in Examples, it is possible to know the concentration difference in the thickness direction of the molded article. Further, when the values of the saponified copolymer concentration (content) given with respect to samples A, B, C and D of the same numerical figure (one of 1, 2 and 3) are compared, it is possible to know the concentration difference in the plane direction of the molded article.

Abbreviations used in Tables of Examples have the following meaning:

PO: polyolefin
LDPE: low density polyethylene
EV: ethylene-vinyl acetate copolymer saponified product
PO/EV: mixing ratio (weight ratio) of polyolefin to ethylene-vinyl acetate copolymer saponified product
$QO_2$: oxygen permeability ($cc/m^2$ day atm $200\mu$)
$QCO_2$: carbon dioxide gas permeability ($cc/cm^2 \cdot day \cdot atm \cdot 200\mu$)
$QH_2O$: water vapor permeability ($g/m^2$ day $50\mu$)

E: tensile elasticity (Young's modulus) ($Kg/cm^2$)
Sf: tensile strength at breakage ($Kg/cm^2$)
ef: tensile distortion at breakage (percent)
HAZE: haze value (percent)
Nf: frequency of breakage at the bottle-falling test (times) (the frequency of the falling tests until the first bottle is broken when 20 bottles are subjected to the falling test 50 times)

EXAMPLE 1

Each of a low density polyethylene having a melt index of 0.34 (measured according to ASTM D-1,238; this will apply correspondingly hereinbelow) and a density of 0.928 (according to ASTM D-1505; this will apply correspondingly hereinbelow), a medium density polyethylene having a melt index of 0.80 and a density of 0.935 and a high density polyethylene having a melt index of 0.30 and a density of 0.955 was individually dry-blended at room temperature with a saponified product of an ethylene-vinyl acetate copolymer having an ethylene content of 25 mole percent and a degree of saponification of 93 percent at a weight ratio of 95 : 5, 85 : 15 or 55 : 45, and the blend was molded into a film of a thickness of about $200\mu$ by employing an extruder installed with a nylon-type screw having a diameter of 25 mm and a length of 625 mm (screw speed rate = 65 rpm; die temperature = 250°C.) and a T-die.

With respect to each of the so molded films, the oxygen permeability $QO_2$ ($cc/m^2$ day atm $200 \mu$) was measured at 27°C. and a relative humidity of 90 percent by means of a gas permeability tester. Results are shown in Table 1. Then, each of the films was pressed at 200°C. under 150 $Kg/cm^2$ for 10 minutes by means of a high pressure press to form a film having a thickness of $50 \pm 2\mu$. The water vapor permeability $QH_2O$ ($g/m^2$ day $50\mu$) was measured according to JIS Z-0208 and the haze value, HAZE (percent), was determined at 20°C. and a relative humidity of 65 percent by employing a haze tester. Results are shown in Table 1.

From the results shown in Table 1, it is seen that the blend system of the low density polyethylene and saponified ethylene-vinyl acetate copolymer exhibits a higher haze value, i.e., higher transparency, than other blend systems, while the permeation resistance against either oxygen or water vapor is not substantially damaged.

With respect to each of samples of a thickness of about 200 $\mu$, the tensile elasticity, E ($Kg/cm^2$), the tensile strength at breakage, Sf ($Kg/cm^2$) and the tensile elongation, ef (percent) were determined at 20°C., a relative humidity of 65 percent and a stretching rate of 300 mm/min. Results are also shown in Table 1.

From the results of these tests shown in Table 1, it can be seen that the blend system of the low density polyethylene and saponified ethylene-vinyl acetate copolymer exhibits a lower tensile elasticity, i.e., a better softness, and a higher elongation at breakage, i.e., a higher impact resistance than the blend combination of the saponfied copolymer with the medium density polyethylene or high density polyethylene.

Table 1

|           |        | $QO_2$ | $QH_2O$ | E     | Sf  | ef   | HAZE |
|-----------|--------|--------|---------|-------|-----|------|------|
| LDPE/EV   | 100/0  | 1110   | 10.8    | 9500  | 185 | 1050 | 32.1 |
| do.       | 95/5   | 560    | 11.7    | 9700  | 185 | 1000 | 31.0 |
| do.       | 85/15  | 155    | 12.6    | 9700  | 185 |      | 30.7 |
| do.       | 55/45  | 22.2   | 22.0    | 10500 | 187 | 850  | 27.5 |
| MDPE/EV   | 100/0  | 840    | 6.3     | 17900 | 187 | 590  | 42.6 |
| do.       | 95/5   | 490    | 9.6     | 18500 | 189 | 540  | 42.0 |
| do.       | 85/15  | 142    | 11.5    | 19000 | 195 | 460  | 41.5 |
| do.       | 55/45  | 20.0   | 21.5    | 19200 | 202 | 330  | 38.2 |
| HDPE/EV   | 100/0  | 550    | 3.9     | 22400 | 189 | 360  | 87.5 |
| do.       | 95/5   | 407    | 6.6     | 21700 | 192 | 320  | 86.5 |
| do.       | 85/15  | 136    | 10.1    | 21600 | 198 | 280  | 85.2 |
| do.       | 55/45  | 18.2   | 18.0    | 21300 | 205 | 220  | 73.6 |
| EV.       | 0/100  | 5.6    | 145     | 19500 | 300 | 200  | 21.5 |

LDPE: melt index = 0.34; density = 0.928 (low density polyethylene)
MDPE: melt index = 0.80; density = 0.935 (medium density polyethylene)
HDPE: melt index = 0.30; density = 0.955 (high density polyethylene)
EV : saponification degree = 93 %; ethylene content = 25 mole % (saponified ethylene-vinyl acetate copolymer)

EXAMPLE 2

A low density polyethylene having a melt index of 2.1 and a density of 0.917 was dry-blended at room temperature at a weight ratio indicated in Table 2, and 12 films shown in Table 2 were molded from the blends under the same extrusion molding conditions with use of the same extrusion-molding apparatus as in Example 1.

With respect to each of the films, the oxygen permeability, $QO_2$ (under the same conditions as in Example 1), the carbon dioxide permeability, $QCO_2$ (under the same conditions as in determination of the oxygen permeability), the water vapor permeability, $QH_2O$ (under the same conditions as in Example 1), the tensile elasticity, E ($Kg/cm^2$), the tensile strength at breakage, $Sf$ ($Kg/cm^2$) and the tensile elongation, $ef$ (percent) were measured. The determination of the tensile characteristics was conducted by employing a tensile tester under the conditions of a stretching rate of 300 mm/min, a temperature of 20°C. and a relative humidity of 65 percent. Also the haze value, HAZE (percent) was determined with respect to each sample. Results are shown in Table 2.

Table 2

| LDPE/EV | $QO_2$ | $QCO_2$ | $QH_2O$ | E | $Sf$ | $ef$ | HAZE |
|---|---|---|---|---|---|---|---|
| (Et: $V_A$ = 25 : 75) | | | | | | | |
| 100/0 | 1600 | 19000 | 14.0 | 8000 | 133 | 2200 | 20.0 |
| 99/1 | 1550 | 17500 | 14.5 | 8000 | 133 | 2200 | 20.0 |
| 98/2 | 840 | 5320 | 14.7 | 8100 | 135 | 2000 | 20.0 |
| 95/5 | 600 | 2680 | 14.8 | 8200 | 136 | 2000 | 19.7 |
| 85/15 | 165 | 870 | 15.5 | 8200 | 136 | 1950 | 19.5 |
| 75/25 | 71.1 | 390 | 17.9 | 8500 | 134 | 1800 | 20.2 |
| 65/35 | 36.5 | 195 | 20.2 | 8700 | 135 | 1800 | 20.3 |
| 55/45 | 22.7 | 109 | 23.9 | 8900 | 137 | 1700 | 21.0 |
| 40/50 | 13.9 | 54.7 | 33.3 | 11000 | 161 | 1350 | 21.0 |
| 30/70 | 10.3 | 37.1 | 45.0 | 14200 | 190 | 500 | 21.5 |
| 20/80 | 8.0 | 27.6 | 63.1 | 16800 | 223 | 250 | 21.5 |
| 0/100 | 5.6 | 18.2 | 145 | 19500 | 300 | 200 | 21.5 |

From the results, it is seen that within the concentration of the saponified ethylene-vinyl acetate copolymer ranging from 2 to 45 percent by weight, the gas-barring property can be improved without substantial degradation of excellent properties inherent of the low polyethylene, that is, a high water vapor permeation resistance and high tensile characteristics (tensile elasticity, tensile strength at breakage and tensile elongation at breakage).

EXAMPLE 3

Twelve films shown in Table 3 were molded under the same extrusion molding conditions with use of the same extrusion-molding apparatus as in Example 1 from blends prepared by dry-blending a low density polyethylene having a melt index of 2.1 and a density of 0.917 with a saponified product of an ethylene-vinyl acetate copolymer having an ethylene content of 75 mole percent and a degree of saponification of 93 percent at mixing weight ratios indicated in Table 3.

With respect to each of the so formed films, the oxygen permeability, carbon dioxide gas permeability, water vapor permeability, tensile characteristics and haze value were determined under the same conditions by the same methods as in Example 2. Results are shown in Table 3.

From the results it is seen that within the concentration of the saponified ethylene-vinyl acetate copolymer ranging from 2 to 60 percent by weight, the gas barring property can be improved without substantial degradation of the merits of the low density polyethylene, such as high water vapor permeation resistance and high tensile characteristics.

Table 3

| LDPE/EV | $QO_2$ | $QCO_2$ | $QH_2O$ | E | $Sf$ | $ef$ | HAZE |
|---|---|---|---|---|---|---|---|
| (Et : $V_A$ = 75 : 25) | | | | | | | |
| 100/0 | 1600 | 19000 | 14.0 | 8000 | 133 | 2200 | 20.0 |
| 99/1 | 1600 | 18500 | 14.4 | 8000 | 133 | 2200 | 20.2 |
| 98/2 | 1400 | 16500 | 14.6 | 8000 | 13.2 | 2100 | 20.5 |
| 95/5 | 1270 | 14500 | 14.5 | 8100 | 138 | 2100 | 20.5 |
| 85/15 | 970 | 29500 | 15.0 | 8100 | 135 | 2050 | 20.7 |
| 75/25 | 760 | 7200 | 15.1 | 8000 | 135 | 2050 | 20.8 |
| 65/35 | 600 | 5600 | 15.5 | 8200 | 135 | 2000 | 21.0 |
| 55/45 | 490 | 4500 | 15.9 | 8500 | 135 | 1900 | 21.2 |
| 40/60 | 400 | 3400 | 17.5 | 8900 | 151 | 1550 | 24.0 |
| 30/70 | 345 | 3000 | 20.0 | 9000 | 169 | 950 | 26.4 |
| 20/80 | 305 | 2700 | 21.8 | 10200 | 182 | 700 | 28.5 |
| 0/100 | 280 | 2500 | 26.2 | 10500 | 190 | 650 | 31.3 |

EXAMPLE 4

Twelve films shown in Table 4 were molded under the same extrusion molding conditions with use of the same extrusionmolding apparatus as in Example 1 from blends prepared by dryblending a low density polyethylene having a melt index of 2.1 and a density of 0.917 with a saponified product of an ethylene-vinyl acetate copolymer having an ethylene content of 25 mole percent and a degree of saponification of 99 percent at mixing ratios indicated in Table 4.

With respect to each of these sample films, the oxygen permeability, carbon dioxide gas permeability, water vapor permeability, tensile characteristics and haze value were determined under the same conditions by the same methods as in Example 2. Results are shown in Table 4.

From the results, it is seen that within the concentration of the saponified ethylene-vinyl acetate copolymer ranging from 2 to 45 percent by weight, the gas-barring property can be improved without substantial degradation of the low density polyethylene, such as a high water vapor permeation resistance and excellent tensile characteristics.

Table 4

| LDPE/EV | $QO_2$ | $QCO_2$ | $QH_2O$ | E | $Sf$ | $\epsilon f$ | HAZE |
|---|---|---|---|---|---|---|---|
| (Et : $V_A$ = 25 : 75 − Y) | | | | | | | |
| 100/0 | 1600 | 19000 | 14.0 | 8000 | 133 | 2200 | 20.0 |
| 99/1 | 1550 | 17000 | 14.2 | 8000 | 133 | 2100 | 20.0 |
| 98/2 | 820 | 5300 | 14.5 | 8000 | 133 | 2100 | 20.2 |
| 95/5 | 600 | 2650 | 14.6 | 8200 | 137 | 2000 | 20.0 |
| 85/15 | 160 | 850 | 15.0 | 8100 | 139 | 1950 | 19.7 |
| 75/25 | 70.2 | 360 | 16.8 | 8500 | 139 | 1900 | 20.0 |
| 65/35 | 35.1 | 190 | 19.0 | 8800 | 141 | 1850 | 20.3 |
| 55/45 | 16.9 | 101 | 22.1 | 9100 | 143 | 1700 | 20.5 |
| 40/60 | 8.1 | 50.0 | 32.0 | 12000 | 165 | 1250 | 20.3 |
| 30/70 | 4.8 | 28.5 | 39.9 | 15500 | 197 | 400 | 20.1 |
| 20/80 | 3.0 | 17.8 | 52.6 | 17900 | 255 | 200 | 19.9 |
| 0/100 | 1.3 | 7.0 | 95.3 | 22000 | 320 | 150 | 20.0 |

EXAMPLE 5

Twelve films shown in Table 5 were molded under the same extrusion molding conditions with use of the same extrusion-molding apparatus as in Example 1 from blends formed by dry-blending a low density polyethylene having a melt index of 2.1 and a density of 0.917 with a saponified product of an ethylene-vinyl acetate copolymer having an ethylene content of 75 mole percent and a degree of saponification of 99 percent at mixing weight ratios indicated in Table 5.

With respect to each of these films, the oxygen permeability, carbon dioxide gas permeability, water vapor permeability, tensile characteristics and haze value were determined under the same conditions by the same methods as in Example 2. Results are shown in Table 5.

From the results, it is seen that within the concentration of the saponified ethylene-vinyl acetate copolymer ranging from 2 to 60 percent by weight, the gas-barring property can be improved without substantial degradation of the merits of the low density polyethylene.

Table 5

| LDPE/EV | $QO_2$ | $QCO_2$ | $QH_2O$ | E | $Sf$ | $\epsilon f$ | HAZE |
|---|---|---|---|---|---|---|---|
| (Et : $V_A$ = 75 : 25) | | | | | | | |
| 100/0 | 1600 | 19000 | 14.0 | 8000 | 133 | 2200 | 20.0 |
| 99/1 | 1600 | 18500 | 14.0 | 8000 | 133 | 2150 | 20.0 |
| 98/2 | 1350 | 16000 | 13.9 | 8100 | 133 | 2100 | 20.8 |
| 95/5 | 1200 | 14500 | 14.2 | 8200 | 134 | 2050 | 20.5 |
| 85/15 | 930 | 9600 | 14.5 | 8200 | 135 | 2050 | 20.8 |
| 75/25 | 700 | 6900 | 14.6 | 8100 | 136 | 2000 | 21.0 |
| 65/35 | 550 | 4900 | 14.8 | 8400 | 137 | 1950 | 21.1 |
| 55/45 | 340 | 3700 | 14.7 | 8600 | 139 | 1950 | 20.9 |
| 40/60 | 290 | 2500 | 15.2 | 9200 | 155 | 1500 | 23.8 |
| 30/70 | 165 | 1950 | 16.0 | 10300 | 174 | 800 | 26.0 |
| 20/80 | 135 | 1500 | 17.1 | 11500 | 197 | 650 | 28.0 |
| 0/100 | 70.2 | 850 | 18.0 | 12000 | 200 | 550 | 30.2 |

EXAMPLE 6

Twelve films shown in Table 6 were molded under the same extrusion-molding conditions with use of the same extrusion-molding apparatus as in Example 1 from blends formed by dry-blending a low density polyethylene having a melt index of 0.34 and a density of 0.928 with a saponified product of an ethylene-vinyl acetate copolymer having an ethylene content of 25 mole percent and a degree of saponification of 93 percent at mixing weight ratios indicated in Table 6.

With respect to each of the so formed films, the oxygen permeability, carbon dioxide gas permeability, water vapor permeability, tensile characteristics and haze value were determined under the same conditions by the same methods as in Example 2. Results are shown in Table 6.

From the results it is seen that within the concentration of the saponified ethylene-vinyl acetate copolymer ranging from 2 to 45 percent by weight, the gas-barring property can be improved without substantial degradation of excellent characteristics of the low density polyethylene.

Table 6

| LDPE/EV | $QO_2$ | $QCO_2$ | $QH_2O$ | E | $Sf$ | $\epsilon f$ | HAZE |
|---|---|---|---|---|---|---|---|
| (Et: $V_A$ = 25 : 75 − Y) | | | | | | | |
| 100/0 | 1100 | 16000 | 10.8 | 9500 | 185 | 1050 | 32.1 |
| 99/1 | 1050 | 16500 | 10.9 | 3500 | 184 | 1050 | 32.1 |
| 98/2 | 770 | 4540 | 11.6 | 9600 | 185 | 1000 | 32.0 |

Table 6—Continued

| LDPE/EV | $QO_2$ | $QCO_2$ | $QH_2O$ | E | $S_f$ | $\epsilon_f$ | HAZE |
|---|---|---|---|---|---|---|---|
| (Et: $V_A = 25 : 75 - Y$) | | | | | | | |
| 95/5 | 560 | 2450 | 11.7 | 9700 | 185 | 1000 | 31.0 |
| 85/15 | 155 | 820 | 12.6 | 9700 | 185 | 950 | 30.7 |
| 75/25 | 70.9 | 340 | 15.1 | 9800 | 186 | 900 | 30.1 |
| 65/35 | 36.0 | 177 | 17.8 | 10000 | 187 | 900 | 28.9 |
| 55/45 | 22.2 | 104 | 22.0 | 10500 | 187 | 850 | 27.5 |
| 40/60 | 13.6 | 52.6 | 33.0 | 12700 | 190 | 650 | 24.9 |
| 30/70 | 10.4 | 36.5 | 45.1 | 14900 | 195 | 350 | 23.0 |
| 20/80 | 7.8 | 26.4 | 63.3 | 17000 | 227 | 250 | 22.0 |
| 0/100 | 5.6 | 18.2 | 145 | 19500 | 800 | 200 | 21.5 |

EXAMPLE 7

Twelve films shown in Table 7 were molded under the same extrusion molding conditions with use of the same extrusion-molding apparatus as in Example 1 from blends formed by dry-blending a low density polyethylene having a melt index of 0.34 and a density of 0.928 with a saponified product of an ethylene-vinyl acetate copolymer having an ethylene content of 75 mole percent and a degree of saponification of 93 percent at mixing weight ratios indicated in Table 7.

With respect to each of the so formed films, the oxygen permeability, carbon dioxide gas permeability, water vapor permeability, tensile characteristics and haze value were determined under the same conditions by the same methods as in Example 2. Results are shown in Table 7.

From the results, it is seen that within the concentration of the saponified ethylene-vinyl acetate copolymer ranging from 2 to 60 percent by weight, the gas-barring property can be improved without substantial degradation of excellent characteristics of the low density polyethylene.

EXAMPLE 8

Twelve films shown in Table 8 were molded under the same extrusion molding conditions with use of the same extrusion-molding apparatus as in Example 1 from blends formed by dry-blending a low density polyethylene having a melt index of 0.34 and a density of 0.928 with a saponified product of an ethylene-vinyl acetate copolymer having an ethylene content of 25 mole percent and a degree of saponification of 99 percent at mixing weight ratios indicated in Table 8.

With respect to each of the so formed films, the oxygen permeability, carbon dioxide gas permeability, water vapor permeability, tensile characteristics and haze value were determined under the same conditions by the same methods as in Example 2. Results are shown in Table 8.

From the results, it is seen that within the concentration of the saponified ethylene-vinyl acetate copolymer ranging from 2 to 45 percent by weight, the gas-barring property can be improved without substantial degradation of the characteristics of the low density polyethylene.

Table 7

| LDPE/EV | $QO_2$ | $QCO_2$ | $QH_2O$ | E | $S_f$ | $\epsilon_f$ | HAZE |
|---|---|---|---|---|---|---|---|
| (Et : $V_A = 75 : 25$) | | | | | | | |
| 100/0 | 1100 | 16000 | 10.8 | 9500 | 185 | 1050 | 32.1 |
| 99/1 | 1100 | 16000 | 10.9 | 9500 | 185 | 1050 | 32.7 |
| 98/2 | 980 | 14000 | 11.7 | 9500 | 186 | 1050 | 33.0 |
| 95/5 | 940 | 13000 | 11.7 | 9600 | 185 | 1060 | 32.9 |
| 98/15 | 738 | 9200 | 12.7 | 9600 | 186 | 1000 | 32.7 |
| 75/25 | 594 | 7150 | 13.4 | 9700 | 187 | 1000 | 32.8 |
| 65/35 | 495 | 5500 | 18.9 | 9800 | 189 | 1000 | 32.6 |
| 55/45 | 420 | 4300 | 14.2 | 9700 | 189 | 950 | 32.2 |
| 40/60 | 363 | 3400 | 16.7 | 9900 | 188 | 850 | 32.0 |
| 30/70 | 330 | 2900 | 21.0 | 10200 | 190 | 800 | 31.7 |
| 20/80 | 300 | 2700 | 22.5 | 10300 | 190 | 700 | 31.4 |
| 0/100 | 280 | 2500 | 26.2 | 10500 | 190 | 650 | 31.3 |

Table 8

| LDPE/EV | $QO_2$ | $QCO_2$ | $QH_2O$ | E | $S_f$ | $\epsilon_f$ | HAZE |
|---|---|---|---|---|---|---|---|
| (Et: $V_A = 25 : 75$) | | | | | | | |
| 100/0 | 1100 | 16000 | 10.8 | 9500 | 185 | 1050 | 32.1 |
| 99/1 | 1100 | 15500 | 10.8 | 9500 | 185 | 1000 | 32.0 |
| 98/2 | 520 | 4000 | 11.0 | 9500 | 185 | 1000 | 32.0 |
| 95/5 | 310 | 2050 | 11.1 | 9700 | 186 | 950 | 31.7 |
| 85/15 | 127 | 760 | 11.3 | 9800 | 188 | 950 | 31.0 |
| 75/25 | 64.8 | 330 | 12.5 | 10000 | 190 | 950 | 30.4 |
| 65/35 | 30.3 | 171 | 16.0 | 10200 | 195 | 900 | 30.1 |
| 55/45 | 16.1 | 94.8 | 19.9 | 10600 | 195 | 900 | 28.7 |
| 40/60 | 7.2 | 48.6 | 30.2 | 14000 | 207 | 550 | 26.0 |
| 30/70 | 4.5 | 29.1 | 40.5 | 15900 | 229 | 350 | 23.2 |
| 20/80 | 2.8 | 17.5 | 53.7 | 18000 | 261 | 200 | 21.9 |
| 0/100 | 1.3 | 7.0 | 95.3 | 22000 | 320 | 150 | 20.0 |

EXAMPLE 9

Twelve films shown in Table 9 were molded under the same extrusion molding conditions with use of the same extrusion-molding apparatus as in Example 1 from blends formed by dry-blending a low density polyethylene having a melt index of 0.34 and a density of 0.928 with a saponified product of an ethylene-vinyl acetate copolymer having an ethylene content of 75 mole percent and a degree of saponification of 99 percent at mixing weight ratios indicated in Table 9.

With respect to each of the so formed films, the oxygen permeability, carbon dioxide gas permeability, water vapor permeability, tensile characteristics and haze value were determined under the same conditions by the same methods as in Example 2. Results are shown in Table 9.

From the results, it is seen that within the concentration of the saponified ethylene-vinyl acetate copolymer ranging from 2 to 45 percent by weight the gas-barring property can be improved without substantial degradation of the characteristics of the low density polyethylene.

an extruder installed with a metering screw (screw rotation rate = 34 rpm; die temperature = 190°C.) and a hollow molder.

For comparison, bottles were molded from the above low density polyethylene or saponified ethylene-vinyl acetate copolymer alone under the same extrusion molding conditions with use of the sasme extrusion molding apparatus as above.

Sample pieces of a prescribed size were taken from back surfaces of the bottles, and the oxygen permeability, $QO_2$ and carbon dioxide gas permeability, $QCO_2$ ($cc/m^2 \cdot day \cdot atm$. 200 $\mu$) were measured at a temperature of 27°C. and a relative humidity of 90 percent. Distilled water (200 cc) was charged into each of these bottles (3 bottles per sample blend), and the bottles were plugged up and allowed to stand still in an atmosphere of a temperature of 50°C. and a relative humidity of of 10 percent for 30 days. The water vapor permeation, $QH_2O$ ($g/m^2 \cdot day \cdot 50\mu$) was determined from the decrease of the amount of water during this period. Further, bottles (20 bottles per sample blend) were charged with 200 cc of saline water of −5°C. and they Table 9

| LDPE/EV | $QO_2$ | $QCO_2$ | $QH_2O$ | E | $Sf$ | $\epsilon$ | HAZE |
|---|---|---|---|---|---|---|---|
| (Et : $V_A$ = 75 : 25) | | | | | | | |
| 100/0 | 1100 | 16000 | 10.8 | 9500 | 185 | 1050 | 32.1 |
| 99/1 | 1100 | 16000 | 10.8 | 9500 | 185 | 1000 | 32.2 |
| 98/2 | 950 | 13500 | 11.0 | 9400 | 185 | 1000 | 32.0 |
| 95/5 | 880 | 12500 | 11.0 | 9500 | 187 | 1000 | 32.0 |
| 85/15 | 670 | 8600 | 11.1 | 9600 | 186 | 950 | 31.9 |
| 75/25 | 473 | 6700 | 11.3 | 9700 | 187 | 950 | 31.7 |
| 65/35 | 341 | 4800 | 11.5 | 9700 | 188 | 900 | 31.6 |
| 55/45 | 251 | 3500 | 11.9 | 9900 | 190 | 850 | 31.4 |
| 40/60 | 165 | 2300 | 14.2 | 10400 | 194 | 750 | 30.9 |
| 30/70 | 127 | 1800 | 15.4 | 10500 | 197 | 700 | 30.6 |
| 20/80 | 116 | 1400 | 16.9 | 11600 | 199 | 600 | 30.5 |
| 0/100 | 70.2 | 850 | 18.0 | 12000 | 200 | 550 | 30.2 |

EXAMPLE 10

Two low density polyethylenes, one having a melt index of 1.4 and a density of 0.920, and the other having a melt index of 0.34 and a density of 0.928 were individually dry-blended at room temperature with either of two saponified ethylene-vinyl acetate copolymers, one having an ethylene content of 25 mole percent and a degree of saponification of 99 percent and the other having an ethylene content of 40 mole percent and a degree of saponification of 99 percent, at mixing weight ratios indicated in Table 10. The blends were molded into flat bottles having a thickness of about 500 $\mu$ and an inner capacity of about 210 cc by employing were allowed to stand still at 0°C. overnight. Then, they were let to fall on a concrete floor from a height of 1.2 m and the average frequency of breakage, Nf (times) was measured.

Results of the above tests of the oxygen permeability, carbon dioxide gas permeability, water vapor permeability and the average frequency of breakage are shown in Table 10. From these results, it is seen that within the concentration of the saponified ethylene-vinyl acetate copolymer of up to 40 percent by weight, the gas-barring property can be improved without substantial degradation of the merits of the low density polyethylene, such as water vapor permeation resistance and high impact resistance.

Table 10

| | Density of PE | Et content of EV | PE/EV | $QO_2$ | $QCO_2$ | $QH_2O$ | Nf |
|---|---|---|---|---|---|---|---|
| MI 1.4 | 0.920 | — | 100/0 | 1450 | 18000 | 12.2 | 50 |
| | do. | 25 | 95/5 | 455 | 2400 | 12.3 | 50 |
| | do. | do. | 85/15 | 175 | 815 | 12.5 | 50 |
| | do. | do. | 55/45 | 21.5 | 108 | 20.1 | 37 |
| | do. | 40 | 95/5 | 471 | 2550 | 12.2 | 50 |
| | do. | do. | 85/15 | 236 | 1150 | 12.8 | 50 |
| | do. | do. | 55/45 | 32.9 | 184 | 15.8 | 41 |
| MI 0.34 | 0.928 | — | 100/0 | 1100 | 16000 | 10.5 | 50 |
| | do. | 25 | 95/5 | 300 | 2050 | 10.7 | 50 |
| | do. | do. | 85/15 | 132 | 770 | 11.0 | 50 |
| | do. | do. | 55/45 | 16.7 | 99.2 | 18.7 | 36 |
| | do. | 40 | 95/5 | 352 | 2200 | 10.5 | 50 |

Table 10 – Continued

| Density of PE | Et content of EV | PE/EV | $QO_2$ | $QCO_2$ | $QH_2O$ | Nf |
|---|---|---|---|---|---|---|
| do. | do. | 85/15 | 175 | 955 | 10.9 | 50 |
| do. | do. | 55/45 | 25.7 | 169 | 14.0 | 39 |
| — | 25 | 0/100 | 1.5 | 9.6 | 97.2 | 1 |
| — | 40 | 0/100 | 4.8 | 78.1 | 45.6 | 2 |

EXAMPLE 11

A 55 : 45 (weight ratio) mixture of a low density polyethylene having a melt index of 0.34 and a density of 0.928 and a saponified product of an ethylene-vinyl acetate copolymer having an ethylene content of 25 mole percent and a degree of saponification of 93 percent was incorporated with 10.0 parts by weight, per 100 parts by weight of the mixture, of an isotactic polypropylene resin having a melt index of 1.0, and they were melt-blended at 230°C. with use of a pelletizer having a diameter of 40 mm. The resulting pellets were molded into a film having a thickness of about $200\mu$ under the same extrusion molding conditions with use of the same extrusion molding apparatus as in Example 1. The oxygen permeability and water vapor permeability of the above composition were measured under the same conditions by the same methods as in Example 2. As a result, it was found that the composition had an oxygen permeability of 24.5 cc/m² day atm $200\mu$ and a water vapor permeability of 21.7 g/m² day $50\mu$.

EXAMPLE 12

A 85 : 15 (weight ratio) mixture of a low density polyethylene having a melt index of 2.1 and a density of 0.917 and a saponified product of an ethylene-vinyl acetate copolymer having an ethylene content of 25 mole percent and a degree of saponification of 99 percent was incorporated with 0.5 part by weight, per 100 parts of the mixture, of a polyisobutylene having a viscosity average molecular weight of 1,000,000, and they were dry-blended at room temperature and molded into a film of a thickness of about $200\mu$ under the same extrusion molding conditions with use of the same extrusion molding apparatus as in Example 1.

The oxygen permeability and water vapor permeability of the composition were determined under the same conditions by the same methods as in Example 2. As a result, it was found that the composition had an oxygen permeability of 171 cc/m² day atm $200\mu$ and a water vapor permeability of 15.1 g/m² day $50\mu$.

EXAMPLE 13

A low density polyethylene having a density of 0.920, a melt index of 3.0 and a density of the melt at 190°C. of 0.764 was melt-extruded at a screw rotation rate of 100 rpm and a resin temperature at the die portion of 190°C. with use of an extruder equipped with a metering screw having a diameter of 40 mm and an effective length of 1120 mm and a die having a diameter of 10 mm and a length of 50 mm, and the average flow rate of 19.5 cm/sec was calculated from the amount extruded (42.0 Kg/hr). A saponified product having an ethylene content of 25.4 mole percent, a degree of saponification of 99.2 percent, an intrinsic viscosity of 0.08 $l/g$ and a density of the melt at 190°C. of 1.07 was melt-extruded under the same conditions with use of the same extruder as above, and the average flow rate of 12.5 cm/sec was calculatrd from the amount extruded (37.6 Kg/hr).

The above low density polyethylene and saponified ethylene-vinyl acetate copolymer were preliminarily mixed at a weight ratio of 75 : 25. A dry blender of the tumbler type was used for this preliminary mixing and the dry blending (preliminary mixing) was conducted at room temperature for 10 minutes.

The so dry-blended mixture was melt-extruded under the same conditions with use of the same extruder as above, and molded into a sheet having a width of about 10 cm and a thickness of $300\mu$ according to a known extrusion method. The resin pressure at the die portion at this operation was 16 Kg/cm².

The resulting sheet having a thickness of $300\mu$ was subjected to the oxygen permeability test employing a gas permeability tester (pressure method) at a temperature of 27°C. and a relative humidity on the atmospheric pressure side of 90 percent. As a result, it was found that the sheet had an oxygen permeability of 8 cc/m² day atm.

The central portion of the sample sheet was taken according to the sampling method described in the text of the instant specification, and the cut-out portion was divided into three layers in the thickness direction. The division was conducted with use of a microtome, and each layer had a thickness of about $100\mu$.

Each of the layers was pressed at 195°C. for 2 minutes under a pressure of 150 Kg/cm² to form a thin film of a thickness of about $16\mu$, and with respect to the so formed thin film, the absorption at 3320 cm⁻¹ was measured at a temperature of 20°C. and a relative humidity of 40 percent with use of an infrared spectrophotometer. The log (Io/I) $\sqrt{\mu}$ value, the saponified ethylene-vinyl acetate copolymer concentration, and $m_1$ and $m_2$ values of each·layer are shown in Table 11. From these data, it is seen that the concentrations in the plane direction is identical within the range of the experimental error (±1 percent) and a significant difference of the concentration is brought about in the thickness direction.

Table 11

| | (EV Content = 25 % by weight) | | | |
|---|---|---|---|---|
| Identification of layer | $\dfrac{\log(Io/I)}{\bar{\mu}} \times 10^3$ | Concentration of saponified product (% by weight) | $m_1$ | $m_2$ |
| A-1 | 28.3 | 33 | 1.32 | |
| B-1 | 28.3 | 33 | 1.32 | |
| C-1 | 28.0 | 33 | 1.32 | |
| D-1 | 28.1 | 33 | 1.32 | |
| A-2 | 5.5 | 6.5 | | 0.26 |
| B-2 | 5.1 | 6.0 | | 0.24 |
| C-2 | 5.7 | 6.7 | | 0.27 |
| D-2 | 5.7 | 6.7 | | 0.27 |
| A-3 | 29.8 | 35 | 1.40 | |
| B-3 | 30.2 | 36 | 1.44 | |
| C-3 | 29.9 | 35 | 1.40 | |
| D-3 | 28.8 | 35 | 1.40 | |

COMPARATIVE EXAMPLE 1

A low density polyethylene having the same properties (density, melt index and density of the melt) as those of the low density polyethylene used in Example 13 was melt-extruded at a screw rotation rate of 100 rpm and a resin temperature at the die portion of 190°C. with use of an extruder equipped with a Dulmadge screw having a diameter of 40 mm and an effective length of 1120 mm and being provided at the end point portion with a mixing zone of 10 flights and a die having a diameter of 10 mm and a length of 50 mm, and the average flow rate of 17.6 cm/sec was calculated from the amount extruded (37.9 Kg/hr). A saponified product of an ethylene-vinyl acetate copolymer having the same properties (ethylene content, degree of saponification, intrinsic viscosity and density of the melt) as those of the saponified copolymer used in Example 13 was melt extruded under the same conditions with use of the same extruder as described above, and the average flow rate of 11.3 cm/sec was calculated from the amount extruded (33.8 Kg/hr).

The above low density polyethylene and saponified ethylene-vinyl acetate copolymer were preliminarily mixed (dry-blended) at a weight ratio of 75 : 25 under the same conditions according to the same method as in Example 13.

The dry-blended mixture was melt-extruded under the same conditions according to the same method as in Example 13. Thus, a sheet of a width of 10 cm and a thickness of 300$\mu$ was molded while adjusting the rotation rate of a take-up roll. At this operation, the resin pressure at the die portion was 15 Kg/cm².

The oxygen permeability of the so formed sheet (having a thickness of 300$\mu$) was measured under the same conditions with use of the same tester as in Example 13. As a result, it was found that the sheet had an oxygen permeability of 193 cc/m²·day·atm.

The sample sheet was divided into 3 layers under the same conditions according to the same method as in Example 13 to form thin films of about 15$\mu$ thickness, and the films were subjected to the same tests as in Example 13 to determine the log(Io/I) $\sqrt{\mu}$ value, the saponified ethylene-vinyl acetate copolymer concentration, and $m_1$ and $m_2$ values. Results are shown in Table 12. From the results, it is seen that the saponified copolymer concentration is almost identical in either the plane or thickness direction.

Table 12

(EV Content = 25% by weight)

| Identification of layer | log(Io/I) / $\overline{\mu}$ ×10³ | Concentration of saponified product (% by weight) | $m_1$ | $m_2$ |
| --- | --- | --- | --- | --- |
| A-1 | 21.7 | 25 | 1.00 | |
| B-1 | 21.4 | 25 | 1.00 | |
| C-1 | 21.6 | 25 | 1.00 | |
| D-1 | 21.5 | 25 | 1.00 | |
| A-2 | 20.3 | 24 | | 0.96 |
| B-2 | 20.5 | 24 | | 0.96 |
| C-2 | 20.0 | 24 | | 0.96 |
| D-2 | 20.3 | 24 | | 0.96 |
| A-3 | 21.8 | 26 | 1.04 | |
| B-3 | 21.8 | 26 | 1.04 | |
| C-3 | 22.1 | 26 | 1.04 | |
| D-3 | 22.0 | 26 | 1.04 | |

With respect to the above sheet and the sheet obtained in Example 13, the water vapor permeability and transparency were evaluated. The measurement of the water vapor permeability was conducted according to JIS Z-0208, and it was found that the above sheet had a water vapor permeability of 6.2 g/m²·day·300$\mu$ and the sheet obtained in Example 13 had a water vapor permeability of 2.5 g/m²·day·300$\mu$. The transparency was evaluated based on the visual observation test by 25 men. More specifically, both sheets were presented before testers and an answer was requested as to which sheet was seen more transparent. Not one of the panel answered that the sheet obtained in this Comparative Example 1 was more transparent, and 25 men of the panel answered that the sheet obtained in Example 13 was more transparent.

EXAMPLE 14

A low density polyethylene having a density of 0.920, a melt index of 0.3 and a density of the melt at 240°C. of 0.736 was melt-extruded at a screw rotation rate of 80 rpm and a resin temperature at the die portion of 240°C. with use of an extruder equipped with a metering screw having a diameter of 40 mm and an effective length of 1120 mm and a die having a diameter of 10 mm and a length of 50 mm, and the average flow rate of 9.2 cm/sec was calculated from the amount extruded (19.1 Kg/hr). Separately, a saponified product having an ethylene content of 25.4 mole percent, a degree of saponification of 99.2 percent, an intrinsic viscosity of 0.08 l/g and a density of melt at 240°C. of 1.025 was melt-extruded under the same conditions with use of the same extruder as described above, and the average flow rate of 12.0 cm/sec was calculated from the amount extruded (34.7 Kg/hr).

The above low density polyethylene and saponified ethylene-vinyl acetate copolymer were preliminarily mixed at a weight ratio of 75 : 25. The preliminary mixing was conducted by employing a dry blender of the tumbler type and the dry blending (preliminary mixing) was effected at room temperature for 10 minutes.

The dry-blended mixture was melt-extruded under the same conditions with use of the same extruder as described above, and a sheet of an average thickness of 300$\mu$ was molded by a known extrusion method. At this operation, the resin pressure at the die portion was 13 Kg/cm².

The central portion of the sample sheet having a prescribed area (a disc of a 7 cm diameter) was taken, and with respect to the cut-out sample, the oxygen permeability was measured under the same conditions with use of the same tester as in Example 13. It was found that the sample having a 300$\mu$ thickness had an oxygen permeability of 14 cc/m²·day·atm.

The sampling was carried out according to the sampling method described in the test of the specification and each of obtained samples was divided into three layers in the thickness direction by means of a microtome. Each layer had a thickness of about 100$\mu$.

Each of the layers was pressed under the same conditions as in Example 13 with use of a high pressure press to form a thin film of a thickness of about 17$\mu$. With respect to the so formed thin film sample, the absorption at 3320 cm$^{-1}$ was measured by means of an infrared spectrophotometer. The measurement conditions were the same as in Example 13. log(Io/I) $\sqrt{\mu}$ value, saponified ethylene-vinyl acetate copolymer concentration, and $m_1$ and $m_2$ values of each layer are shown in Table 13.

Table 13

(EV Content = 25 % by weight)

| Identification of layer | $\frac{\log(Io/I)}{\overline{\mu}} \times 10^3$ | Concentration of saponified product (% by weight) | $m_1$ | $m_2$ |
|---|---|---|---|---|
| A-1 | 17.0 | 20 | | 0.80 |
| B-1 | 17.3 | 20 | | 0.80 |
| C-1 | 17.3 | 20 | | 0.80 |
| D-1 | 17.2 | 20 | | 0.80 |
| A-2 | 30.3 | 36 | 1.44 | |
| B-2 | 30.6 | 36 | 1.44 | |
| C-2 | 30.7 | 36 | 1.44 | |
| D-2 | 30.6 | 36 | 1.44 | |
| A-3 | 16.3 | 19 | | 0.76 |
| B-3 | 15.7 | 19 | | 0.76 |
| C-3 | 15.8 | 19 | | 0.76 |
| D-3 | 16.1 | 19 | | 0.76 |

Comparative Example 2

A low density polyethylene having the same properties (density, melt index and density of the melt) as those of the low density polyethylene used in Example 14 was melt-extruded at a resin temperature at the die portion of 240°C. and a screw rotation rate of 10 rpm with use of an extruder equipped with the same screw and die as used in Example 14, and the average flow rate of 1.2 cm/sec was calculated from the amount extruded (2.4 Kg/hr). Separately, a saponified product of an ethylene-vinyl acetate copolymer having the same properties (ethylene content, degree of saponification, intrinsic viscosity and density of the melt) as those of the saponified copolymer used in Example 14 was melt-extruded under the same conditions with use of the same extruder as described above, and the average flow rate of 1.5 cm/sec was calculated from the amount extruded (4.4 Kg/hr).

The above low density polyethylene and saponified ethylene-vinyl acetate copolymer were preliminarily mixed (dry-blended) at a weight ratio of 75 : 25. The preliminary mixing was conducted under the same conditions according the same method as in Example 14.

The so dry-blended mixture was molded into a sheet having an average thickness of 300μ under the same extrusion conditions with use of the same extruder according to the same method as described above. At this operation, the resin pressure at the die portion was 2 Kg/cm².

The central portion of a prescribed area (a disc of a 7 cm diameter) was taken from the resulting sheet, and the oxygen permeability was measured under the same conditions with use of the same tester as in Example 13. As a result, it was found that the sample had an oxygen permeability of 65 cc/m² day atm 300μ.

Samples were collected from the sheet according to the sampling method described in the text of the specification, and each of them was divided into three layers in the thickness direction by means of a microtome. Each layer was found to have a thickness of about 100μ.

Each of the layers was pressed under the same conditions as in Example 13 by means of a high pressure press to form a thin film having a thickness of about 16μ, and the absorption at 3320 cm⁻¹ was measured with respect to each film by means of an infrared spec-trophotometer under the same conditions as in Example 13. The $\log(Io/I)$ $\sqrt{\overline{\mu}}$ value, saponified copolymer concentration, and $m_1$ and $m_2$ values of each layer are shown in Table 14.

Table 14

(EV Content = 25 % by weight)

| Identification of layer | $\frac{\log(Io/I)}{\overline{\mu}} \times 10^3$ | Concentration of saponified product (% by weight) | $m_1$ | $m_2$ |
|---|---|---|---|---|
| A-1 | 20.3 | 24 | | 0.96 |
| B-1 | 20.4 | 24 | | 0.96 |
| C-1 | 20.4 | 24 | | 0.96 |
| D-1 | 20.4 | 24 | | 0.96 |
| A-2 | 24.9 | 29 | 1.16 | |
| B-2 | 25.1 | 29 | 1.16 | |
| C-2 | 25.1 | 29 | 1.16 | |
| D-2 | 24.7 | 29 | 1.16 | |
| A-3 | 18.7 | 22 | | 0.88 |
| B-3 | 18.0 | 22 | | 0.88 |
| C-3 | 18.0 | 22 | | 0.88 |
| D-3 | 18.7 | 22 | | 0.88 |

The sheet obtained in this Comparative Example 2 and the sheet obtained in Example 14 were evaluated in the same manner as in Comparative Example 1. Four men of the panel answered that the transparency of the sheet obtained in this Comparative Example 2 was better, and 21 men of the panel answered that the transparency of the sheet obtained in Example 14 was better.

EXAMPLE 15

A low density polyethylene having a density of 0.920, a melt index of 3.0 and a density of the melt at 190°C. of 0.764 was melt-extruded at a screw rotation rate of 100 rpm and a resin temperature at the die portion of 190°C. by means of an extruder equipped with a metering screw having a diameter of 40 mm and an effective length of 1120 mm and a die having a diameter of 10 mm and a length of 50 mm, and the average flow rate of 19.5 cm/sec was calculated from the amount extruded (42.0 Kg/hr). Separately, a saponified product of an ethylene-vinyl acetate copolymer having an ethylene content of 25.4 mole percent, a degree of saponification of 99.2 %, an intrinsic viscosity of 0.08 l/g and a density of the melt at 190°C. of 1.065 was melt-extruded under the same conditions with use of the same extruder as described above, and the average flow rate of 19.5 cm/sec was calculated from the amount extruded (37.6 Kg/hr).

The above low density polyethylene and saponified ethylene-vinyl acetate copolymer were preliminarily mixed at a weight ratio of 95 : 5. The preliminary mixing was conducted with use of a dry blender of the tumbler type and the dry blending (preliminary mixing) was effected at room temperature for 10 minutes.

The so dry-blended mixture was melt-extruded under the same conditions with use of the same extruder as described above, and a sheet having an average thickness of 300μ was molded according to a known extrusion method. At this operation, the resin pressure at the die portion was 20 Kg/cm².

A prescribed area (a disc of a 7 cm diameter) was taken from the central portion of the resulting sheet, and the oxygen permeability was determined under the same conditions with use of the same tester as in Example 13. It was found that the sheet had an oxygen permeability of 76 cc/m² day atm 300μ.

Samples were collected from the sheet according to the sampling method described in the text of the specification, and each sample was divided into three layers in the thickness direction by means of a microtome. Each layer had a thickness of about 100μ.

Each layer was pressed under a pressure of 50 Kg/cm² with use of a high pressure press in the same manner as in Example 13 to obtain a thin film of a thickness of about 70μ. With respect to each film, the absorption at 3320 cm⁻¹ was measured with use of an infrared spectrophotometer in the same manner as in Example 13. The log(Io/I) $\sqrt{\mu}$ value, saponified ethylene-vinyl acetate copolymer concentration, and $m_1$ and $m_2$ values of each layer are shown in Table 15.

Table 15

(EV Content = 5.0 % by weight)

| Identification of layer | $\frac{\log(Io/I)}{\overline{\mu}} \times 10^3$ | Concentration of saponified product (% by weight) | $m_1$ | $m_2$ |
|---|---|---|---|---|
| A-1 | 5.7 | 6.7 | 1.34 | |
| B-1 | 5.8 | 6.8 | 1.36 | |
| C-1 | 5.8 | 6.8 | 1.36 | |
| D-1 | 5.9 | 6.9 | 1.38 | |
| A-2 | 0.7 | 0.8 | | 0.16 |
| B-2 | 0.4 | 0.5 | | 0.10 |
| C-2 | 0.8 | 0.9 | | 0.18 |
| D-2 | 0.3 | 0.8 | | 0.06 |
| A-3 | 6.3 | 7.5 | 1.50 | |
| B-3 | 6.5 | 7.7 | 1.54 | |
| C-3 | 6.2 | 7.3 | 1.46 | |
| D-3 | 6.6 | 7.8 | 1.56 | |

EXAMPLE 16

The same low density polyethylene as used in Example 15 and the same saponified ehtylene-vinyl acetate copolymer as used in Example 15 were preliminarily mixed (dry-blended) at a weight ratio of 85 : 15. The method and conditions of the preliminary mixing were quite the same as in Example 15.

The dry-blended mixture was molded into a sheet having an average thickness of 300μ under the same conditions with use of the smae extruder according to the same molding method as in Example 15. At this operation, the resin pressure at the die portion was 18 Kg/cm².

A prescribed area (a disc having a diameter of 7 cm) was taken from the central portion of the sheet, and the oxygen permeability was determined under the same conditions with use of the same tester as in Example 13. As a result, the sheet was found to have an oxygen permeability of 17 cc/m² day atm 300μ.

Samples were collected from the sheet according to the sampling method described in the text of the specification, and each sample was divided into three layers with use of a microtome. Each layer had a thickness of about 100μ.

Each layer sample was pressed under a pressure of 100 Kg/cm² with use of a high pressure press in the same manner as in Example 13 to obtain a thin film having a thickness of about 27μ. The absorption at 3320 cm⁻¹ was measured by means of an infrared spectrophotometer with respect to each film. The log(Io/I) $\sqrt{\mu}$ value, saponified ehtylene-vinyl acetate copolymer concentration, and $m_1$ and $m_2$ values of each layer are shown in Table 16.

Table 16

(EV Content = 15 % by weight)

| Identification of layer | $\frac{\log(Io/I)}{\overline{\mu}} \times 10^3$ | Concentration of saponified product (% by weight) | $m_1$ | $m_2$ |
|---|---|---|---|---|
| A-1 | 16.3 | 19 | 1.27 | |
| B-1 | 16.5 | 19 | 1.27 | |
| C-1 | 16.3 | 19 | 1.27 | |
| D-1 | 16.4 | 19 | 1.27 | |
| A-2 | 9.5 | 5.3 | | 0.35 |
| B-2 | 9.2 | 5.0 | | 0.33 |
| C-2 | 9.8 | 5.6 | | 0.37 |
| D-2 | 9.4 | 5.2 | | 0.35 |
| A-3 | 17.4 | 21 | 1.40 | |
| B-3 | 17.5 | 21 | 1.40 | |
| C-3 | 17.2 | 20 | 1.33 | |
| D-3 | 17.4 | 21 | 1.40 | |

COMPARATIVE EXAMPLE 3

The same low density polyethylene as used in Example 15 and the same saponified ethylene-vinyl acetate copolymer as used in Example 15 were preliminarily mixed (dry-blended) at a weight ratio of 70 : 30 under the same conditions according to the same method as in Example 15.

The dry-blended mixture was molded into a sheet having an average thickness of 300μ under the same conditions with use of the same extruder according to the same molding method as in Example 15. At this operation, the resin pressure at the die portion was 15 Kg/cm².

A prescribed area (a disc having a diameter of 7 cm) was taken from the central portion of the sheet, and the oxygen permeability was determined under the same conditions with use of the same tester as tn Example 15. As a result, the sheet was found to have an oxygen permeability of 6 cc/m² day atm 300μ.

Samples were collected from the sheet according to the sampling method described in the text of the specification, and each sample was divided into three layers in the thickness direction by means of a microtome. Each layer had a thickness of about 100μ.

Each layer was pressed under a pressure of 250 Kg/cm² with use of a high pressure press in the same manner as in Example 13 to obtain a thin film having a thickness of about 10μ. With respect to each film, the absorption at 3320 cm⁻¹ was measured with use of an infrared spectronphotometer under the same conditions as in Example 13. The log(Io/I) $\sqrt{\mu}$ value, saponified ethylene-vinyl acetate copolymer concentration, and $m_1$ and $m_2$ values of each layer are shown in Table 17.

Table 17

(EV Content = 30 % by weight)

| Identification of layer | $\frac{\log(Io/I)}{\overline{\mu}} \times 10^3$ | Concentration of saponified product (% by weight) | $m_1$ | $m_2$ |
|---|---|---|---|---|
| A-1 | 30.2 | 36 | 1.20 | |
| B-1 | 30.1 | 35 | 1.17 | |
| C-1 | 30.0 | 35 | 1.17 | |
| D-1 | 30.1 | 35 | 1.17 | |

Table 17-Continued (EV Content = 30 % by weight)

| Identification of layer | $\frac{\log(Io/I)}{\overline{\mu}} \times 10^3$ | Concentration of saponified product (% by weight) | $m_1$ | $m_2$ |
|---|---|---|---|---|
| A-2 | 16.0 | 19 | | 0.63 |
| B-2 | 16.2 | 19 | | 0.63 |
| C-2 | 16.2 | 19 | | 0.63 |
| D-2 | 16.3 | 19 | | 0.63 |
| A-3 | 30.0 | 35 | | 1.17 |
| B-3 | 30.3 | 36 | | 1.20 |
| C-3 | 30.3 | 36 | | 1.20 |
| D-3 | 30.2 | 36 | | 1.20 |

When the water vapor permeability of the sheet was measured according to JIS Z-0208, it was found that the water vapor permeability was 6.9 g/m² day 300μ.

EXAMPLE 17

A low density polyethylene having a density of 0.920, a melt index of 0.3 and a density of the melt at 240°C. of 0.736 was melt-extruded at a screw rotation rate of 60 rpm and a resin temperature at the die portion of 240°C. with use of an extruder equipped with a metering screw having a diameter of 50 mm and an effective length of 1100 mm and a die having a diameter of 10 mm and a length of 570 mm, and the average flow rate of 9.3 cm/sec was calculated from the amount extruded (19.3 Kg/hr). Separately, a saponified product of an ethylenevinyl acetate copolymer having an ethylene content of 30.5 mole percent, a degree of saponification of 98.1 percent, an intrinsic viscosity of 0.12 l/g and a density of the melt at 240°C. of 1.017 was melt-extruded under the same conditions with use of the same extruder as described above, and the average flow rate of 11.9 cm/sec was calculated from the amount extruded (34.0 Kg/hr).

The above low density polyethylene and saponified ethylene-vinyl acetate copolymer were preliminarily mixed at a weight ratio of 95 : 5 with use of a dry blender. The dry blending (preliminary mixing) was effected at room temperature for 3 minutes.

The dry-blended mixture was melt-extruded under the same extrusion conditions with use of the same extruder as described above, and an ellipsoidal bottle having a long axis of 9 cm and a short axis of 3 cm and having an average thickness of 450μ was molded according to a known hollow molding method. At this operation, the resin pressure at the die portion was 24 Kg/cm².

A prescribed area (a disc having a diameter of 7 cm) was taken from the back face portion of the bottle (in the direction of the long axis) and the oxygen permeability was determined under the same conditions with use of the same tester as described in Example 13. As a result, it was found that the sample had an oxygen permeability of 80 cc/m² day atm 450μ.

Samples were collected according to the sampling method described in the text of the specification, and each sample was divided into three layers in the thickness direction by means of a microtome. Each layer had a thickness of about 150μ.

Each layer sample was pressed under a pressure of 45 Kg/cm² with use of a high pressure press in the same manner as in Example 13 to obtain a thin film having a thickness of about 75μ. With respect to each film, the absorption at 3320 cm⁻¹ was determined by means of an infrared spectrophotometer in the same manner as in Example 13. The log(Io/I) $\sqrt{\mu}$ value, saponified ethylene-vinyl acetate concentration, and $m_1$ and $m_2$ values of each layer are shown in table 18.

Table 18

| Identification of layer | $\log(Io/I) \times 10^3 / \overline{\mu}$ | Concentration of saponified product (% by weight) | $m_1$ | $m_2$ |
|---|---|---|---|---|
| A-1 | 1.1 | 1.6 | | 0.32 |
| B-1 | 1.2 | 1.7 | | 0.34 |
| C-1 | 1.1 | 1.6 | | 0.32 |
| D-1 | 1.2 | 1.7 | | 0.34 |
| A-2 | 1.4 | 2.0 | | 0.40 |
| B-2 | 1.5 | 2.1 | | 0.42 |
| C-2 | 1.5 | 2.1 | | 0.42 |
| D-2 | 1.3 | 1.9 | | 0.38 |
| A-3 | 8.0 | 11 | 2.20 | |
| B-3 | 7.8 | 11 | 2.20 | |
| C-3 | 7.9 | 11 | 2.20 | |
| D-3 | 8.0 | 11 | 2.20 | |

(EV Content = 5.0 % by weight)

The container obtained by the above-described procedures was ground by means of a grinder until the volume of the ground pieces was less than 1 cm³. The ground pieces were melt-extruded under the same conditions with use of the same extuder as described above, and an ellipsoidal bottle having a long axis of 9 cm and a short axis of 3 cm and having an average thickness of 450μ was molded according to a known hollow molding method. At this operation, the resin pressure at the die portion was 25 Kg/cm².

A prescribed area (a disc having a diameter of 7 cm) was taken from the back face portion of the bottle (in the direction of the long axis), and the oxygen permeability was determined under the same conditions with use off the same tester as in Example 13. As a result, the sample was found to have an oxygen permeability of 83 cc/m² day atm 450μ.

Samples were collected from the bottle according to the sampling method described in the text of the specification, and each sample was divided into three layers in the thickness direction by means of a microtome. Each layer had a thickness of about 150μ.

Each sample layer was pressed under a pressure of 45 Kg/cm² with use of a high pressure press in the same manner as in Example 13 to obtain a thin film of a thickness of about 75μ. With respect to each film, the absorption at 3320 cm⁻¹ was determined by means of an infrated spectrophotometer under the same conditions as in Example 13. The log(Io/I) $\sqrt{\mu}$ value, saponified ethylene-vinyl acetate copolymer concentration, and $m_1$ and $m_2$ values of each layer are shown in Table 19.

Table 19

| Identification of layer | $\log(Io/I) \times 10^3 / \overline{\mu}$ | Concentration of saponified product (% by weight) | $m_1$ | $m_2$ |
|---|---|---|---|---|
| A-1 | 1.2 | 1.7 | | 0.34 |
| B-1 | 1.3 | 1.8 | | 0.36 |
| C-1 | 1.1 | 1.6 | | 0.32 |
| D-1 | 1.2 | 1.7 | | 0.34 |
| A-2 | 1.6 | 2.3 | | 0.46 |

(EV Content = 5.0 % by weight)

Table 19-Continued

| Identification of layer | (EV Content = 5.0 % by weight) | | | |
|---|---|---|---|---|
| | log(Io/I) × 10³ $\bar{\mu}$ | Concentration of saponified product (% by weight) | $m_1$ | $m_2$ |
| B-2 | 1.6 | 2.3 | | 0.46 |
| C-2 | 1.6 | 2.3 | | 0.46 |
| D-2 | 1.5 | 2.2 | | 0.44 |
| A-3 | 7.7 | 11 | 2.20 | |
| B-3 | 7.6 | 11 | 2.20 | |
| C-3 | 7.8 | 11 | 2.20 | |
| D-3 | 7.8 | 11 | 2.20 | |

EXAMPLE 18

The same low density polyethylene as used in Example 17 and the same saponified ethylene-vinyl acetate copolymer as used in Example 17 were preliminarily mixed (dry-blended) at a weight ratio of 85 : 15 under the same conditions according to the same method as in Example 17.

The dry-blended mixture was molded into an ellipsoidal bottle having an average thickness of 450$\mu$, a long axis length of 9 cm and a short axis length of 3 cm under the same conditions, with use of the same extruder and according to the same molding method as in Example 17. At this operation, the resin pressure at the die portion was 21 Kg/cm².

A prescribed area (a disc having a diameter of 7 cm) was taken from the back face of the so obtained bottle (in the direction of the long axis), and the oxygen permeability was determined under the same conditions with use of the same tester as in Example 13. As a result, the sample was found to have an oxygen permeability of 16 cc/m² day atm 450$\mu$.

Samples were collected according to the sampling method described in the text of the specification, and each sample was divided into three layers in the thickness direction by means of a microtome. Each layer had a thickness of about 150$\mu$.

Each layer sample was pressed under a pressure of 100 Kg/cm² with use of a high pressure press in the same manner as in Example 13 to obtain a thin film having a thickness of about 25$\mu$. With respect to each film, the absorption at 3320 cm⁻¹ was determined with use of an infrared spectrophotometer under the same conditions as in Example 13. The log(Io/I) $\sqrt{\mu}$ value, saponified ethylene-vinyl acetate copolymer concentration, and $m_1$ and $m_2$ values of each layer are shown in Table 20.

Table 20

| Identification of layer | (EV Content = 15 % by weight) | | | |
|---|---|---|---|---|
| | log(Io/I) × 10³ $\bar{\mu}$ | Concentration of saponified product (% by weight) | $m_1$ | $m_2$ |
| A-1 | 4.8 | 6.9 | | 0.46 |
| B-1 | 5.0 | 7.1 | | 0.47 |
| C-1 | 4.9 | 7.0 | | 0.47 |
| D-1 | 5.0 | 7.2 | | 0.48 |
| A-2 | 11.7 | 17 | 1.13 | |
| B-2 | 11.7 | 17 | 1.13 | |
| C-2 | 11.7 | 17 | 1.13 | |
| D-2 | 11.5 | 16 | 1.06 | |
| A-3 | 14.9 | 21 | 1.40 | |
| B-3 | 14.8 | 21 | 1.40 | |
| C-3 | 14.9 | 21 | 1.40 | |
| D-3 | 15.4 | 22 | 1.47 | |

EXAMPLE 19

The same low density polyethylene as used in Example 17 and the same saponfied ethylene-vinyl acetate copolymer as used in Example 17 were primarily mixed (dry-blended) at a weight ratio of 75 : 25 under the same conditions according to the same method as in Example 17.

The dry-blended mixture was molded into an ellipsoidal bottle having an average thickness of 450$\mu$, a long axis length of 9 cm and a short axis length of 3 cm under the same conditions, with use of the same extruder and according to the same molding method as in Example 17. At this operation, the resin pressure at the die portion was 19 Kg/cm².

A prescribed area (a disc of a diameter of 7 cm) was taken from the back face of the so obtained bottle (in the long axis direction), and the oxygen permeability was determined under the same conditions with use of the same tester as in Example 13. As a result, the sample was found to have an oxygen permeability of 7 cc/m² day atm 450$\mu$.

Samples were collected according to the sampling method described in the text of the specification, and each sample was divided into three layers in the thickness direction by means of a microtome. Each layer had a thickness of about 150 $\mu$.

Each same layer was pressed under a pressure of 150 Kg/cm² with use of a high pressure press in the same manner as in Example 13 to obtain a thin film having a thickness of about 17$\mu$. With respect to each film, the absorption at 3320 cm⁻¹ was determined by means of an infrared spectrophotometer under the same conditions as in Example 13. The log(Io/I) $\sqrt{\mu}$ value, saponified ethylene-vinyl acetate copolymer concentration, and $m_1$ and $m_2$ values of each layer are shown in Table 21.

Table 21

| Identification of layer | (EV Content = 25 % by weight) | | | |
|---|---|---|---|---|
| | log(Io/I) × 10³ $\bar{\mu}$ | Concentration of saponified product (% by weight) | $m_1$ | $m_2$ |
| A-1 | 9.4 | 13 | | 0.52 |
| B-1 | 9.4 | 13 | | 0.52 |
| C-1 | 9.4 | 13 | | 0.52 |
| D-1 | 9.6 | 14 | | 0.56 |
| A-2 | 18.2 | 26 | 1.04 | |
| B-2 | 18.2 | 26 | 1.04 | |
| C-2 | 18.3 | 26 | 1.04 | |
| D-2 | 18.1 | 26 | 1.04 | |
| A-3 | 24.8 | 36 | 1.44 | |
| B-3 | 24.8 | 36 | 1.44 | |
| C-3 | 24.8 | 36 | 1.44 | |
| D-3 | 24.5 | 35 | 1.40 | |

The bottle prepared by the above-mentioned procedures was ground by means of a grinder until the volume of the ground pieces was less than 1 cm³. The ground pieces were melt-extruded again under the same conditions with use of the same extruder as described above, and an ellipsoidal bottle having an average thickness of 450 $\mu$, a long axis length of 9 cm and a short axis length of 3 cm was molded according to a known hollow molding method. At this operation, the resin pressure at the die portion was 19 Kg/cm².

A prescribed area (a disc of a diameter of 7 cm) was taken from the back face portion of the bottle (in the long axis direction), and the oxygen permeability was determined under the same conditions with use of the same tester as in Example 13. As a result, the sample was found to have an oxygen permeability of 9 cc/m² day atm 450μ.

Samples were collected according to the sampling method described in the text of the specification, and each sample was divided into three layers in the thickness direction by means of a microtome. Each layer had a thickness of about 150μ.

Each sample layer was pressed under a pressure of 150 Kg/cm² with use of a high pressure press in the same manner as in Example 13 to obtain a thin film having a thickness of about 16 μ. With respect to each film, the absorption at 3320 cm⁻¹ was determined with use of an infrared spectrophotometer under the same conditions as in Example 13. The log(Io/I) $\sqrt{\mu}$ value, saponified ethylene-vinyl acetate copolymer concentration, and $m_1$ and $m_2$ values of each layer are shown in Table 22.

Table 22

| Identification of layer | (EV Content = 25 % by weight) | | | |
|---|---|---|---|---|
| | log(Io/I) × 10³ $\overline{\mu}$ | Concentration of saponified product (% by weight) | $m_1$ | $m_2$ |
| A-1 | 10.6 | 15 | | 0.60 |
| B-1 | 10.5 | 15 | | 0.60 |
| C-1 | 10.6 | 15 | | 0.60 |
| D-1 | 10.6 | 15 | | 0.60 |
| A-2 | 17.6 | 25 | 1.00 | |
| B-2 | 17.7 | 25 | 1.00 | |
| C-2 | 17.8 | 25 | 1.00 | |
| D-2 | 17.6 | 25 | 1.00 | |
| A-3 | 24.2 | 35 | 1.40 | |
| B-3 | 24.3 | 35 | 1.40 | |
| C-3 | 24.2 | 35 | 1.40 | |
| D-3 | 24.2 | 35 | 1.40 | |

COMPARATIVE EXAMPLE 4

The same low density polyethylene as used in Example 17 and the same saponified ethylene-vinyl acetate copolymer as used in Example 17 were preliminarily mixed (dry-blended) at a weight ratio of 70 : 30 under the same conditions according to the same method as in Example 17.

The dry-blended mixture was molded into an ellipsoidal bottle having an average thickness of 450μ, a long axis length of 9 cm and a short axis length of 3 cm under the same conditions, with use of the same extruder and according to the same molding method as in Example 17. At this operation, the resin pressure at the die portion of 18 Kg/cm².

A prescribed area (a disc having a diameter of 7 cm) was taken from the back face portion of the bottle (in the long axis direction), and the oxygen permeability was determined under the same conditions with use of the same tester as in Example 13. As a result, the sample was found to have an oxygen permeability of 6 cc/m² day atm 450μ.

Samples were collected according to the sampling method described in the text of the specification, and each sample was divided into three layers in the thickness direction by means of a microtome. Each layer had a thickness of about 150μ.

Each sample layer was pressed under a pressure of 250 Kg/cm² with use of a high pressure press in the same manner as in Example 13 to obtain a thin film having a thickness of about 12μ. With respect to each film, absorption at 3320 cm⁻¹ was determined by means of an infrared spectrophotometer under the same conditions as in Example 13. The log (Io/I) $\sqrt{\mu}$ value, saponified ethylene-vinyl acetate copolymer concentration, and $m_1$ and $m_2$ values are shown in Table 23.

Table 23

| Identification of layer | (EV Content = 30 % by weight) | | | |
|---|---|---|---|---|
| | log(Io/I) × 10³ $\overline{\mu}$ | Concentration of saponified product (% by weight) | $m_1$ | $m_2$ |
| A-1 | 16.3 | 23 | | 0.77 |
| B-1 | 16.6 | 24 | | 0.80 |
| C-1 | 16.4 | 23 | | 0.77 |
| D-1 | 16.2 | 23 | | 0.77 |
| A-2 | 22.4 | 32 | 1.07 | |
| B-2 | 21.7 | 31 | 1.03 | |
| C-2 | 22.4 | 32 | 1.07 | |
| D-2 | 22.4 | 32 | 1.07 | |
| A-3 | 24.5 | 35 | 1.17 | |
| B-3 | 24.5 | 35 | 1.17 | |
| C-3 | 24.5 | 35 | 1.17 | |
| D-3 | 24.4 | 35 | 1.17 | |

EXAMPLE 20

A high density polyethylene having a density of 0.945, a melt index of 0.2 and a density of the melt at 185°C. of 0.782 was melt-extruded at a screw rotation rate of 40 rpm and a resin temperature at the die portion of 185°C. with use of an extruder equipped with a metering screw having a diameter of 50 mm and an effective length of 1100 mm and a die having a diameter of 10 mm and length of 570 mm, and the average flow rate of 5.4 cm/sec was calculated from the amount extruded (11.8 Kg/hr). Separately, a saponified product of an ethylenevinyl acetate copolymer having an ethylene content of 25.4 mole percent, a degree of saponification of 99.2 percent, an intrinsic viscosity of 0.08 l/g and a density of the melt at 185°C. of 1.065 was melt-extruded under the same conditions with use of the same extruder as described above, and the average flow rate of 6.4 cm/sec was calculated from the amount extruded (19.2 Kg/hr).

The above high density polyethylene and saponified ethylene-vinyl acetate copolymer were preliminarily mixed at a weight ratio of 95 : 5. The primary mixing was conducted with use of a Henschel dry blender, and the dry blending (preliminary mixing) was effected at room temperature for 3 minutes.

The dry-blended mixture was melt-extruded under the same condition with use of the same extruder as described above, and an ellipsoidal tube having an average thickness of 300 μ, a long axis length of 9 cm and a short axis length of 4 cm was molded according to a known extrusion-molding method. At this operation, the resin pressure at the die portion was 95 Kg/cm².

A prescribed area (a disc having a diameter of 7 cm) was taken from the back face portion of the tube (in the direction of the long axis), and the oxygen permeability was determined under the same conditions with use of the same tester as in Example 13. As a result, the same was found to have an oxygen permeability of 81 cc/m² day atm 300 μ.

Samples were collected according to the sampling method described in the text of the specification, and each sample was divided into three layers in the thickness direction by means of a microtome. Each layer had a thickness of about 100μ.

Each sample layer was pressed under a pressure of 25 Kg/cm² with use of a high pressure press in the same manner as in Example 13 to obtain a thin film having a thickness of about 84μ. With respect to each film, the absorption at 3320 cm⁻¹ was determined by means of an infrared spectrophotometer under the same conditions as in Example 13. The log(Io/I) $\sqrt{\mu}$ value, saponified ethylene-vinyl acetate copolymer concentration, and $m_1$ and $m_2$ values of each layer are shown in Table 24.

Table 24

| Identification of layer | (EV Content = 5.0 % by weight) | | | |
|---|---|---|---|---|
| | log(Io/I) × 10³ $\overline{\mu}$ | Concentration of saponified product (% by weight) | $m_1$ | $m_2$ |
| A-1 | 0.9 | 1.0 | | 0.20 |
| B-1 | 0.9 | 1.0 | | 0.20 |
| C-1 | 0.9 | 1.0 | | 0.20 |
| D-1 | 0.8 | 0.9 | | 0.18 |
| A-2 | 1.6 | 1.9 | | 0.38 |
| B-2 | 1.6 | 1.9 | | 0.38 |
| C-2 | 1.7 | 2.0 | | 0.40 |
| D-2 | 1.8 | 2.1 | | 0.42 |
| A-3 | 10.3 | 12 | 2.40 | |
| B-3 | 10.3 | 12 | 2.40 | |
| C-3 | 10.2 | 12 | 2.40 | |
| D-3 | 10.2 | 12 | 2.40 | |

EXAMPLE 21

The same high density polyethylene as used in Example 20 and the same saponified ethylene-vinyl acetate copolymer as used in Example 20 were preliminarily mixed (dry-blended) at a weight ratio of 75 : 25 under the same conditions according to the same method as in Example 20.

The dry-blended mixture was molded into an ellipsoidal tube having an average thickness of 300μ, a long axis length of 9 cm and a short axis length of 4 cm under the same conditions, with use of the same extruder and according to the same molding method as in Example 20. At this operation, the resin pressure at the die portion was 65 Kg/cm².

A prescribed area (a disc having a diameter of 7 cm) was taken from the back face portion of the tube in the direction of the long axis, and the oxygen permeability was determined under the same condition with use of the same tester as in Example 13. As a result, the sample was found to have an oxygen permeability of 8 cc/m² day atm 300μ.

Samples were collected according to the sampling method described in the text of the specification, and each sample was divided into three layers in the thickness direction with use of a microtome. Each layer had a thickness of about 100μ.

Each sample layer was pressed under a pressure of 150 Kg/cm² with use of a high pressure press in the same manner as in Example 13 to obtain a thin film having a thickness of 16μ. With respect to each film, the absorption at 3320 cm⁻¹ was determined by means of an infrared spectrophotometer under the same conditions as in Example 13. The log(Io/I) $\sqrt{\mu}$ value, saponified ethylene-vinyl acetate copolymer concentration, and $m_1$ and $m_2$ values of each film are shown in Table 25.

Table 25

| Identification of layer | (EV Content = 25 % by weight) | | | |
|---|---|---|---|---|
| | log (Io/I) × 10³ $\overline{\mu}$ | Concentration of saponified product (% by weight) | $m_1$ | $m_2$ |
| A-1 | 10.6 | 13 | | 0.52 |
| B-1 | 10.7 | 13 | | 0.52 |
| C-1 | 11.0 | 13 | | 0.52 |
| D-1 | 11.0 | 13 | | 0.52 |
| A-2 | 22.2 | 26 | 1.04 | |
| B-2 | 22.2 | 26 | 1.04 | |
| C-2 | 22.1 | 26 | 1.04 | |
| D-2 | 22.1 | 26 | 1.04 | |
| A-3 | 30.8 | 36 | 1.44 | |
| B-3 | 30.8 | 36 | 1.44 | |
| C-3 | 30.6 | 36 | 1.44 | |
| D-3 | 30.6 | 36 | 1.44 | |

EXAMPLE 22

A low density polyethylene having a density of 0.920, a melt index of 3.0 and a density of the melt at 240°C. of 0.736 was melt-extruded at a screw rotation rate of 60 rpm and a resin temperature at the die portion of 240 C. with use of an extruder equipped with a metering screw having a diameter of 50 mm and an effective length of 1,100 mm and a die having a diameter of 10 mm and a length of 570 mm, and the average flow rate of 14.0 cm/sec was calculated from the amount extruded (29.2 Kg/hr). Separately, a saponified product of an ethylenevinyl acetate copolymer having an ethylene content of 49.4 mole percent, a degree of saponification of 96.3 percent, an intrinsic viscosity of 0.17 l/g and a density of the melt at 240°C. of 0.975 was melt-extruded under the same conditions with use of the same extruder as described above, and the average flow rate of 11.4 cm/sec was calculated from the amount extruded (31.2 Kg/hr).

The above low density polyethylene and saponified ethylene-vinyl acetate copolymer were preliminarily mixed at a weight ratio of 95 : 5. The preliminary mixing was conducted by employing a Henschel dry blender, and the dry blending (preliminary mixing) was effected at room temperature for 3 minutes.

The dry-blended mixture was melt-extruded under the same conditions with use of the same extruder as described above, and an ellipsoidal bottle having an average thickness of 450μ, a long axis length of 9 cm and a short axis length of 3 cm was molded according to a known hollow molding method. At this operation, the resin pressure at the die portion was 12 Kg/cm².

A prescribed area (a disc having a diameter of 7 cm) was taken from the back face portion of the bottle in the direction of the long axis, and the oxygen permeability was determined under the same conditions with use of the same tester as in Example 13. As a result, the sample was found to have an oxygen permeability of 116 cc/m² day atm 450μ.

Samples were collected according to the sampling method described in the text of the specification, and each sample was divided into three layers in the thickness direction with use of a microtome. Each layer had a thickness of about 150μ.

Each sample layer was pressed under a pressure of 25 Kg/cm² with use of a high pressure press in the same manner as in Example 13 to obtain a thin film having a thickness of about 73μ. With respect to each film, the absorption at 3320 cm⁻¹ was determined by means of an infrared spectrophotometer under the same conditions as in Example 13. the log(Io/I) $\sqrt{\mu}$ value, saponified ethylene-vinyl acetate copolymer concentration, and $m_1$ and $m_2$ value of each layer are shown in Table 26.

Table 26

| Identi-fication of layer | uz,7/26 (EV Content = 5.0 % by weight) | | | |
|---|---|---|---|---|
| | log(Io/I) × 10³ $\overline{\mu}$ | Concentration of saponified product (% by weight) | $m_1$ | $m_2$ |
| A-1 | 3.1 | 7.3 | 1.46 | |
| B-1 | 3.1 | 7.3 | 1.46 | |
| C-1 | 3.1 | 7.3 | 1.46 | |
| D-1 | 3.1 | 7.3 | 1.46 | |
| A-2 | 1.7 | 4.0 | | 0.80 |
| B-2 | 1.8 | 4.2 | | 0.84 |
| C-2 | 1.8 | 4.2 | | 0.84 |
| D-2 | 1.8 | 4.2 | | 0.84 |
| A-3 | 1.5 | 3.6 | | 0.72 |
| B-3 | 1.5 | 3.6 | | 0.72 |
| C-3 | 1.5 | 3.6 | | 0.72 |
| D-3 | 1.4 | 3.5 | | 0.70 |

EXAMPLE 23

The same low density polyethylene as used in Example 22 and the same saponified ethylene-vinyl acetate copolymer as used in Example 22 were preliminarily mixed (dry-blended) at a weight ration of 75 : 25 under the same conditions according to the same method as in Example 22.

The dry-blended mixture was molded into an ellipsoidal bottle having an average thickness of 450$\mu$, a long axis length of 9 cm and a short axis length of 3 cm under the same conditions, with use of the same extruder and according to the same molding method as in Example 22. At this operation, the resin pressure at the die portion was 11 Kg/cm².

A prescribed area (a disc having a diameter of 7 cm) was taken from the back face portion of the bottle (in the direction of the long axis), and the oxygen permeability was determined under the same conditions with use of the same tester as in Example 13. As a result, the sample was found to have an oxygen permeability of 12 cc/m² day atm 450$\mu$.

Samples were collected according to the sampling method described in the text of the specification, and each sample was divided into three layers in the thickness direction by means of a microtome. Each layer had a thickness of about 150$\mu$.

Each sample layer was pressed under a pressure of 150 Kg/cm² with use of a high pressure press in the same manner as in Example 13 to obtain a thin film having a thickness of about 15$\mu$. With respect to each film, the absorption at 3320 cm⁻¹ was determined with use of an infrared spectrophotometer under the same conditions as in Example 13. The log(Io/I) $\sqrt{\mu}$ value, saponified ethylene-vinyl acetate copolymer concentration, and $m_1$ and $m_2$ values of each layer are shown in Table 27.

Table 27

| Identi-fication of layer | (EV Content = 25 % by weight) | | | |
|---|---|---|---|---|
| | log(Io/I) × 10³ $\overline{\mu}$ | Concentration of saponified product (% by weight) | $m_1$ | $m_2$ |
| A-1 | 14.8 | 35 | 1.40 | |

Table 27-Continued

| Identi-fication of layer | (EV Content = 25 % by weight) | | | |
|---|---|---|---|---|
| | log(Io/I) × 10³ $\overline{\mu}$ | Concentration of saponified product (% by weight) | $m_1$ | $m_2$ |
| B-1 | 14.7 | 35 | 1.40 | |
| C-1 | 14.7 | 35 | 1.40 | |
| D-1 | 14.4 | 34 | 1.36 | |
| A-2 | 11.1 | 26 | 1.04 | |
| B-2 | 11.1 | 26 | 1.04 | |
| C-2 | 11.0 | 26 | 1.04 | |
| D-2 | 11.4 | 27 | 1.08 | |
| A-3 | 5.9 | 14 | | 0.56 |
| B-3 | 5.9 | 14 | | 0.56 |
| C-3 | 6.0 | 14 | | 0.56 |
| D-3 | 5.9 | 14 | | 0.56 |

What we claim is:

1. A molded structure, said molded structure having been formed by means of extrusion molding from a molten mixture containing (A) a polyolefin and (B) a saponified product of an ethylene-vinyl acetate copolymer having an ethylene content of 25 to 50 mole percent and a degree of saponification of at least 96 percent at a weight ratio of A : B ranging from 95 : 5 to 75 : 25, said molded structure having a layer structure in which the polymer composition is different in the thickness direction but substantially identical in the plane direction and every two adjacent layers are bonded to each other without any intermediate bonding layer of an adhesive, said layer structure consisting essentially of (a) at least one layer in which the saponified ethylene-vinyl acetate copolymer is predominantly distributed, (b) at least one layer in which the polyolefin is predominantly distributed, and (c) at least one layer which comprises the saponified ethylene-vinyl acetate copolymer and the polyolefin in amounts substantially the same as the average content of the ethylene-vinyl acetate copolymer and the polyolefin of layers (a) and (b), said layer (c) intervening between said layer (a) and layer (b) to bond them integrally, said layer structure providing an improved gas permeation resistance, and wherein when said molded structure is divided in three layers in the thickness direction, at least one layer (a) contains the ethylenevinyl acetate copolymer saponified product in an amount expressed by following formula $M_1 = m_1 X$ wherein X is the average content (percent by weight) of the ethylene-vinyl acetate copolymer saponified product in said molded structure, $m_1$ is a number of from 1.2 to 4, and $M_1$ is the content (percent by weight) of the ethylene-vinyl acetate copolymer saponified product in said layer.

and at least one layer (b) contains the ethylene-vinyl acetate copolymer saponified product in an amount expressed by the following formula $M_2 = m_2 X$ wherein X is as defined above, $m_2$ is a number of from 0 to 0.9, and $M_2$ is the content (percent by weight) of the ethylene-vinyl acetate copolymer saponified product in said layer.

2. A molded structure set forth in claim 1, wherein the polyolefin is a crystalline homopolymer or copolymer of an olefin expressed by the following formula

wherein R is a hydrogen atom or an alkyl group of up to 4 carbon atoms.

3. A molded structure set forth in claim 1, wherein the polyolefin is a low density polyethylene having a density of from 0.917 to 0.929 g/cc and a melt index of from 0.05 to 5.0 g/10 cm.

4. A molded structure set forth in claim 1, wherein the polyolefin is a medium density polyethylene having a density of from 0.930 to 0.939 g/cc.

5. A molded structure set forth in claim 1, wherein the polyolefin is a high density polyethylene having a density of at least 0.940 g/cc.

6. A molded structure as set forth in claim 1, wherein the polyolefin is an isotactic polypropylene.

7. A molded structure set forth in claim 1, wherein the ethylene-vinyl acetate copolymer saponified product has an intrinsic viscosity $[\eta]$, measured at 30°C. with use of a mixed solvent of 85 percent by weight of phenol and 15 percent by weight of water, of from 0.07 to 0.17 $l/g$.

8. A molded structure according to claim 1 wherein when said molded structure is divided in three layers in the thickness direction, a first surface layer is said layer (a), and a second layer is said layer (b) and an intermediate layer is said layer (c).

9. A molded structure according to claim 1 wherein when said molded structure is divided in three layers in the thickness direction, two surface layers comprise said layer (a) and an intermediate layer comprises said layer (b).

10. A molded structure according to claim 1 wherein when said molded structure is divided in three layers in the thickness direction, two surface layers comprise said layer (b) and an intermediate layer comprises said layer (a).

11. A molded structure, said molded structure having been formed by means of extrusion molding from a molten mixture containing (A) a polyolefin and (B) a saponified product of an ethylene-vinyl acetate copolymer having an ethylene content of 25 to 50 mole percent and a degree of saponification of at least 96 percent at a weight ratio of A : B ranging from 95 : 5 to 75 : 25, under such condition that the difference between the average flow rate of the polyolefin melt and the average flow rate of the melt of the saponified ethylene-vinyl acetate copolymer is at least 1 cm/sec and the molten mixture moves through the extrusion apparatus in the form of a laminar flow, said molded structure having a layer structure in which the polymer composition is different in the thickness direction but substantially identical in the plane direction said layer structure consisting essentially of (a) at least one layer in which the saponified ethylene-vinyl acetate copolymer is predominantly distributed, (b) at least one layer in which the polyolefin is predominantly distributed, and (c) at least one layer which comprises a mixture of saponified ethylene-vinyl acetate copolymer and the polyolefin in an approximately the same amount as the average content of layers (a) and (b), said layer (c) intervening between said layer (a) and layer (b) to bond them integrally, said layer structure providing an improved gas permeation resistance, and wherein when said molded structure is divided in three layers in the thickness direction, at least one layer (a) contains the ethylene-vinyl acetate copolymer saponified product in an amount expressed by following formula $M_1 = m_1 X$ wherein X is the average content (percent by weight) of the ethylene-vinyl acetate copolymer saponified product in said molded structure, $m_1$ is a number of from 1.2 to 4, and $M_1$ is the content (percent by weight) of the ethylene-vinyl acetate copolymer saponified product in said layer, and at least one layer (b) contains the ethylene-vinyl acetate copolymer saponified product in an amount expressed by the following formula $M_2 = m_2 X$ wherein X is as defined above, $m_2$ is a number of from 0 to 0.9, and $M_2$ is the content (percent by weight) of the ethylene-vinyl acetate copolymer saponified product in said layer.

* * * * *